United States Patent
Feng et al.

(10) Patent No.: US 9,044,703 B2
(45) Date of Patent: Jun. 2, 2015

(54) UNSTEADY-STATE GAS PERMEATION PROCESS

(75) Inventors: Xianshe Feng, Waterloo (CA); Darren F. Lawless, Oakville (CA)

(73) Assignee: IMTEX MEMBRANES CORP., Mississauga, Ontario (CA)

( * ) Notice: Subject to any disclaimer, the term of this patent is extended or adjusted under 35 U.S.C. 154(b) by 0 days.

(21) Appl. No.: 13/402,425

(22) Filed: Feb. 22, 2012

(65) Prior Publication Data

US 2013/0213226 A1 Aug. 22, 2013

(51) Int. Cl.
  *B01D 53/22* (2006.01)
(52) U.S. Cl.
  CPC .......... *B01D 53/22* (2013.01); *B01D 2257/104* (2013.01)
  USPC .................. 95/45; 95/8; 95/19; 95/23; 95/54; 96/4; 96/421; 96/422

(58) Field of Classification Search
  CPC .......................... B01D 53/22; B01D 2257/104
  USPC ......... 95/8, 19, 23, 45, 51, 54; 96/4, 421, 422
  See application file for complete search history.

(56) References Cited

U.S. PATENT DOCUMENTS

| | | | |
|---|---|---|---|
| 4,783,203 A | | 11/1988 | Doshi |
| 4,955,998 A | * | 9/1990 | Ueda et al. ........................ 95/54 |
| 5,053,058 A | * | 10/1991 | Mitariten ............................ 95/8 |
| 5,125,937 A | * | 6/1992 | Sadkowski et al. ................. 96/8 |
| 5,259,869 A | * | 11/1993 | Auvil et al. ........................ 95/52 |
| 5,354,474 A | * | 10/1994 | LaPack et al. ................. 210/640 |
| 5,730,780 A | * | 3/1998 | Booth, III .......................... 95/51 |
| 5,928,409 A | * | 7/1999 | Sirkar ............................... 95/45 |
| 7,393,390 B2 | * | 7/2008 | Matsunaga ........................ 96/10 |

OTHER PUBLICATIONS

Feng, Xianshe et al., "Pressure Swing Permeation: Novel Process for Gas Separation by Membranes", AIChE Journal, Apr. 2000, vol. 46, No. 4, pp. 724-733.*
Xianshe Feng et al., "Pressure Swing Permeation: Novel Process for Gas Separation by Membrans," AIChE J., Apr. 4. 2000, vol. 46, No. 4.
Y.K. Kao et al., "A Pressure Swing Membrane Separation Process", Gas Separation & Purification, vol. 5, Sep. 1991.
Bhide B.D. and Stern S.A., "A New Evaluation of Membrane Processes for the Oxygen Enrichment from air. I. Identification of Optimum Operating Conditions and Process Configuration", J. Membrane Sci., 62, 13 (1991).
Matson S.L., Ward W.J., Kimura S.G. and Browall W.R., "Membrane Oxygen Enrichment II. Economic Assessment",J. Membrane Sci., 29, 79 (1986).
Paul D.R., "Membrane Separation of Gases Using Steady Cyclic Operation", Ind. Eng. Chem. Process Des. Dev., 10, 375 (1989).
Higuchi A., Nakagawa T., "Permselectivities Through Artificial Membranes at a Nonsteady State", J. Appl. Poly. Sci., 37, 2181-2190 (1989).

(Continued)

*Primary Examiner* — Jason M Greene
(74) *Attorney, Agent, or Firm* — Hunton & Williams LLP

(57) ABSTRACT

There is provided a process for effecting permeation of at least an operative material component of an operative mixture from a higher pressure space, through a membrane, and into a lower pressure space, wherein the higher pressure space is disposed in mass transfer communication with the lower pressure space through the membrane.

23 Claims, 12 Drawing Sheets

(56) References Cited

OTHER PUBLICATIONS

Beckman I.N., Shelekhin A.B. and Teplyakov V.V., "Separation of Gas Mixtures in Unsteady State Conditions", J. Membrane Sci., 55, 283-297 (1991).
Robeson L.M., "Correlation of Separation Factor Versus Permeability for Polymeric Membranes", J. Membrane Sci., 62, 165 (1991).
Koros W.J. and Fleming G.K., "Membrane-Based Gas Separation", J. Membrane Sci., 83, 1 (1993).
Liu L., Chakma A. and Feng X, "CO2/N2 Separation by Poly(Ether Block Amide) Thin Film Hollow Fiber Composite Membranes", Ind. Eng. Chem. Res. 44, 6874-6882 (2005).
Li Y, Chung T. S. and Xiao Y, "Seperior Gas Separation Performance of Dual-Layer Hollow Fiber Membranes with an Ultrathin Dense-Selective Layer", J. Membrane Sci., 325, 23-7 (2005).
Hosseini S.S., Li Y., Chung T. S. and Liy Y., "Enhanced Gas Separation Performance of Nanocomposite Membranes Using MgO Nanoparticles", J. Membrane Sci., 302, 207-217 (2007).
Nunes S.P. and Peinemann K.V., "Membrane Technology in the Chemical Industry", Wiley-VCH, Weinhim, 2001.
Koros W.J. and Chern R.T., Separation of Gaseous Mixtures Using Polymer Membranes. In. Handbook of Separation Process Technology, Wiley, New York, 1987, p. 862.
Xianshe Feng, Chuen Y. Pan and John Ivory—Pressure Swing Permeation: Novel Process for Gas Separation by Membranes, AIChE Journal, Apr. 2000, vol. 46, No. 4, pp. 724-733.
International Search Report issued in PCT/CA2013/000149, mailed Mar. 14, 2013.
Notification Concerning Transmittal of International Preliminary Report on Patentability (Chapter 1 of the Patent Cooperation Treaty), 2014.
International Preliminary Report on Patentability, 2014.
Written Opinion of the International Searching Authority, 2013.

\* cited by examiner

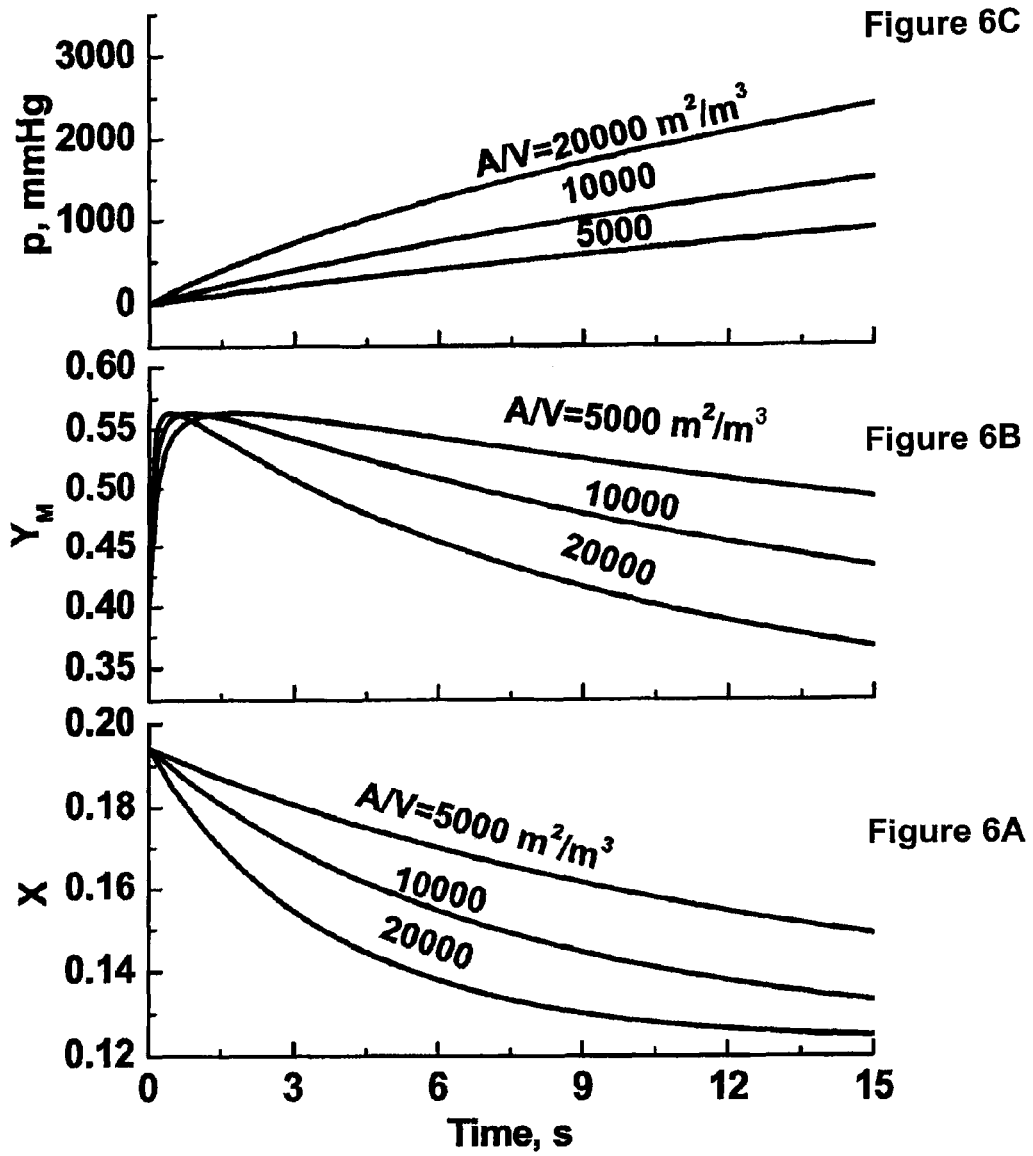

UNSTEADY-STATE GAS PERMEATION PROCESS

FIELD

This disclosure relates to gas permeation processes.

BACKGROUND

Membrane-based separation has proved to be an efficient technology for oxygen enrichment from air, especially for applications where only moderate purity is needed. Typical application of oxygen-enriched air include combustion, ozone generation, aerobic wastewater treatment, medical respiration, diving and high altitude flight breathing. For a given membrane, the separation performance is affected by process design and configuration. Conventional membrane gas separation is operated in a steady-state fashion where both the feed pressure and the permeate pressure are maintained at constant levels. As the transmembrane pressure difference is the driving force for permeation, the most efficient way to enhance permeation is to increase the pressure difference across the membrane. This can be done in two ways: feed pressurization and permeate evacuation. Current technologies, however, are difficult to employ in practice.

SUMMARY

In one aspect, there is provided a process for effecting permeation of at least an operative material component of an operative mixture from a higher pressure space, through a membrane, and into a lower pressure space, wherein the higher pressure space is disposed in mass transfer communication with the lower pressure space through the membrane. The process comprises, after a decrease in a partial pressure differential, between the partial pressure of an operative material component within the higher pressure space and the partial pressure of the operative material component within the lower pressure space, from a higher partial pressure differential, has been effected, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, and while a permeating fraction of the higher pressure space-disposed operative material component is permeating through the membrane, in response to, at least, a reduced partial pressure differential that is below that of the higher partial pressure differential, and being collected within the lower pressure space, effecting a decrease in the partial pressure of the operative material component within the lower pressure space, by effecting discharge of an operative material component discharge fraction of the operative material component, disposed within the lower pressure space, from the lower pressure space, wherein the decrease in the partial pressure of the operative material component within the lower pressure space is a decrease from a pre-discharge pressure. The ratio of the volume of the higher pressure space to the volume of the lower pressure space is greater than 1.

In another aspect, there is provided a process for effecting permeation of at least an operative material component of an operative mixture from a higher pressure space, through a membrane, and into a lower pressure space, wherein the higher pressure space is disposed in mass transfer communication with the lower pressure space through the membrane, comprising, after a decrease in a partial pressure differential, between the partial pressure of an operative material component within a higher pressure space and the partial pressure of the operative material component within a lower pressure space, from a higher partial pressure differential, has been effected, wherein the higher pressure space is disposed in mass transfer communication with the lower pressure space through a membrane, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, such that an increase in the pressure within the lower pressure space to above atmospheric pressure is effected by the permeation of the permeated fraction of the operative material component disposed within the higher pressure space, and while a permeating fraction of the higher pressure space-disposed operative material component is permeating through the membrane, in response to, at least, a reduced partial pressure differential that is below that of the higher partial pressure differential, and being collected within the lower pressure space, effecting a decrease in the partial pressure of the operative material component within the lower pressure space, by effecting discharge of an operative material component discharge fraction from the operative material component disposed within the lower pressure space.

In another aspect, there is provided a process for effecting permeation of at least an operative material component of an operative mixture from a higher pressure space, through a membrane, and into a lower pressure space, wherein the higher pressure space is disposed in mass transfer communication with the lower pressure space through the membrane, comprising, after a decrease in a partial pressure differential, between the partial pressure of an operative material component within a higher pressure space and the partial pressure of the operative material component within a lower pressure space, from a higher partial pressure differential, has been effected, wherein the higher pressure space is disposed in mass transfer communication with the lower pressure space through a membrane, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, and while a permeating fraction of the higher pressure space-disposed operative material component is permeating through the membrane, in response to, at least, a reduced partial pressure differential that is below that of the higher partial pressure differential, and being collected within the lower pressure space, effecting a decrease in the partial pressure of the operative material component within the lower pressure space, by effecting discharge of an operative material component discharge fraction from the operative material component disposed within the lower pressure space, wherein the decrease in the partial pressure of the operative material component within the lower pressure space is a decrease from a pre-discharge pressure. A material mixture feed is supplied from a material mixture source to the higher pressure space while the permeation of the permeated fraction of the higher pressure space-disposed operative material component is being effected, and wherein the supplying of the material mixture feed is at least temporarily suspended prior to the effecting of a decrease in the partial pressure of the operative material component within the lower pressure space. After the supplying of the material mixture feed is at least temporarily suspended, and after the decrease in the partial pressure of the operative material component within the lower pressure space, from the pre-discharge pressure, has been effected, permeation of a permeating fraction of the higher pressure space-disposed operative material component is effected while the partial pressure of the operative material component within lower pressure space is disposed below the pre-discharge pressure and while the permeation of the permeating fraction of the higher pressure space-disposed operative material component is being effected while the partial pressure of the operative material component within the lower pressure space is disposed below the pre-discharge pressure, and a decrease in the partial pressure of the operative material component within the higher pressure space is effected in response to, at least, the permeation of the permeating fraction of the higher pressure space-disposed operative material component that is effected while the partial pressure of the operative material component within the lower pressure space is disposed below the pre-discharge pressure. After the decrease in the partial pressure of the operative material component within the higher pressure space has been effected in response to the permeation of the permeating fraction of the higher pressure space-disposed operative material component that is effected while the partial pressure of the operative material component within the lower pressure space is disposed below the pre-discharge pressure, effecting an increase in the partial pressure of the operative material component within the higher pressure space from a pre-pressure increase pressure, which thereby effects an increase in the molar rate at which the permeation of the permeating fraction of the higher pressure space-disposed operative material component is being effected through the membrane and into the lower pressure space, wherein the increase in the partial pressure of the operative material component within the higher pressure space is effected by supplying of the material mixture feed. Prior to the supplying of the material mixture feed for effecting an increase in the partial pressure of the operative material component within the higher pressure space, discharging at least a fraction of material remaining within the higher pressure space.

BRIEF DESCRIPTION OF DRAWINGS

The process of the preferred embodiments will now be described with reference to the following accompanying drawings, in which:

FIG. 6A is a graph illustrating residue $O_2$ concentration at different (A/V) values as a function of time for Step 2 of the pressure-vacuum swing permeation process being practiced in the system of FIG. 4, for $p_v$=10 mmHg, $P_1$=7 atm, and $V_F$=$V_M$=V;

FIG. 6B is a graph illustrating permeate $O_2$ bulk concentration at different (A/V) values as a function of time for Step 2 of the pressure-vacuum swing permeation process being practiced in the system of FIG. 4, for $p_v$=10 mmHg, $P_1$=7 atm, and $V_F$=$V_M$=V;

FIG. 6C is a graph illustrating permeate pressure at different (A/V) values as a function of time for Step 2 of the pressure-vacuum swing permeation process being practiced in the system of FIG. 4, for $p_v$=10 mmHg, $P_1$=7 atm, and $V_F$=$V_M$=V;

DETAILED DESCRIPTION

Figure 1:
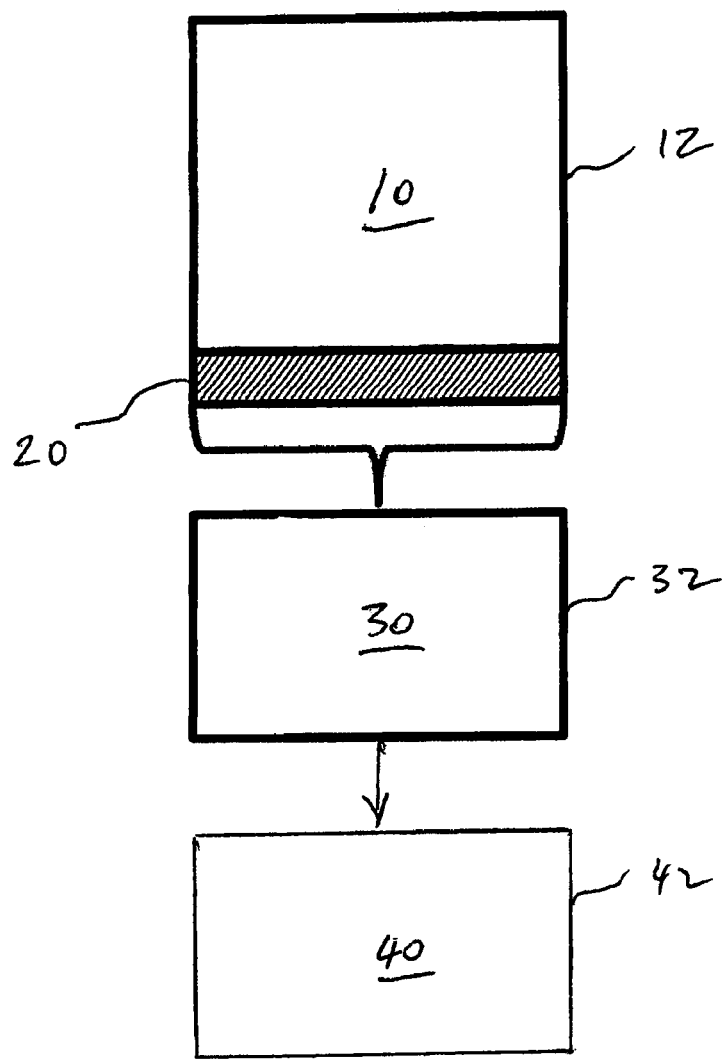
FIG. 1 is an illustration of a system in which is practiced an embodiment of the process.

Referring to FIG. 1, there is provided a process for effecting permeation of at least an operative material component, disposed within an operative mixture, from a higher pressure space 10, through a membrane 20, and into a lower pressure space 30. The operative mixture includes the operative material component and at least another component. The high pressure space 10 is defined within a compartment 12, and the low pressure space 30 is defined within a compartment 32. The higher pressure space 10 is disposed in mass transfer communication with the lower pressure space 30 through the membrane 20. A partial pressure differential, between the partial pressure of the operative material component within the higher pressure space and the partial pressure of the operative material component within the lower pressure space, is provided. A decrease in the partial pressure differential is effected by permeation of a permeated fraction of an operative material component disposed within the higher pressure space 10, from the higher pressure space 10, through the membrane 20, and into the lower pressure space 30. The permeation of the permeated fraction is effected in response to, at least, the partial pressure differential.

In some embodiments, for example, each one of the operative mixture, the operative material component, and the at least another component is gaseous.

After the decrease in the partial pressure differential, from a higher partial pressure differential, has been effected, and while a permeating fraction of the higher pressure space-disposed operative material component is permeating through the membrane 20 and being collected within the lower pressure space 30, a decrease in the partial pressure of the operative material component within the lower pressure space 30 is effected. The permeating of the permeating fraction of the higher pressure space-disposed operative material component through the membrane is effected in response to, at least, a reduced partial pressure differential that is below that of the higher partial pressure differential. The decrease in the partial pressure of the operative material component within the lower pressure space is effected by effecting discharge of an operative material component discharge fraction of the operative material component, disposed within the lower pressure space 30, from the lower pressure space 30. The decrease in the partial pressure of the operative material component within the lower pressure space 30 is a decrease from a pre-discharge pressure.

In one aspect, the ratio of the volume of the higher pressure space 10 to the volume of the lower pressure space 20 is greater than 1. In some embodiments, for example, this ratio is greater than 4. In some embodiments, for example, this ratio is greater than 8. By providing this ratio, permeation of the operative material component is able to continue for a longer period of time, prior to effecting the pressure reduction effected in the lower pressure space.

In some embodiments, for example, prior to the effecting of a decrease in the partial pressure of the operative material component within the lower pressure space 30 by effecting discharge of the operative material component discharge fraction from the lower pressure space 30, a decrease in the partial pressure of the operative material component within the higher pressure space 10 is effected by the permeation of the permeated fraction of the operative material component disposed within the higher pressure space 10.

In some embodiments, for example, prior to the effecting of a decrease in the partial pressure of the operative material component within the lower pressure space 30 by effecting discharge of the operative material component discharge fraction from the lower pressure space 30, a decrease in the pressure within the higher pressure space is effected by the permeation of the permeated fraction of the operative material component disposed within the higher pressure space 10.

In some embodiments, for example, prior to the effecting of a decrease in the partial pressure of the operative material component within the lower pressure space 30 by effecting discharge of the operative material component discharge fraction from the lower pressure space 30, an increase in the partial pressure of the operative material component within the lower pressure space 30 is effected by the permeation of the permeated fraction of the operative material component disposed within the higher pressure space 10.

In some embodiments, for example, prior to the effecting of a decrease in the partial pressure of the operative material component within the lower pressure space 30 by effecting discharge of the operative material component discharge fraction from the lower pressure space 30, an increase in the pressure within the lower pressure space is effected by the permeation of the permeated fraction of the operative material component disposed within the higher pressure space 10.

In some embodiments, for example, the permeation of the permeating fraction of the operative material component disposed within the higher pressure space 10 is being effected while at least one slower-permeating material component is permeating from the higher pressure space 10, through the membrane 20 and into the lower pressure space 30. For each one of the slower permeating components, the ratio of the molar rate of permeation of the slower permeating component to the mole fraction of the slower permeating component within the higher pressure space is less than the ratio of the molar rate of permeation of the operative material component to the mole fraction of the operative material component within the higher pressure space.

In some embodiments, for example, the higher pressure space-disposed operative material component and each one of the slower-permeating material components is included within an operative material mixture disposed in the high pressure space 10. The permeation of the permeating fraction of the higher pressure space-disposed operative material component is being effected while at least one slower-permeating material component is permeating from the higher pressure space 10, through the membrane 20 and into the lower pressure space. For each one of the slower permeating components, the ratio of the molar rate of permeation of the slower permeating component to the mole fraction of the slower permeating component within the higher pressure space is less than the ratio of the molar rate of permeation of the operative material component to the mole fraction of the operative material component within the higher pressure space, such that separation of an operative material-rich separation product, from the operative material mixture, is effected. The operative material-rich separation product is disposed within the lower pressure space 30, and the molar concentration of the operative material component is greater within the operative material-rich separation product than within the operative material mixture.

A slower-permeating material component is a material component that is characterized by a lower permeability through the membrane than that of the operative material component. Such lower permeability may be derived from its relatively lower diffusivity in the membrane, its relatively lower solubility in the membrane, or both.

In some embodiments, for example, the operative material mixture is gaseous.

In some embodiments, for example, the effecting of a decrease in the partial pressure differential includes effecting an increase in the partial pressure of the operative material component within the lower pressure space 30.

In some embodiments, for example, the effecting of a decrease in the partial pressure differential includes effecting a decrease in the partial pressure of the operative material component within the higher pressure space 10.

In some embodiments, for example, the effecting of a decrease in the partial pressure of the operative material component within the lower pressure space 30 is effected in response to the sensing of a first permeating operative material component low permeation rate indication.

In some embodiments, for example, the first permeating operative material component low permeation rate indication is a high operative material component partial pressure indication within the lower pressure space 30.

In some embodiments, for example, the high operative material component partial pressure indication within the lower pressure space is a pressure that exceeds a predetermined maximum pressure within the lower pressure space 30.

In some embodiments, for example, the predetermined maximum pressure is equal to or greater than one atmosphere.

In some embodiments, for example, the predetermined maximum pressure is equal to or greater than atmospheric pressure.

In some embodiments, for example, the effecting of a decrease in the partial pressure of the operative material component within the lower pressure space 30 effects a decrease in the pressure of the lower pressure space 30 to below atmospheric pressure.

In some embodiments, for example, the effecting of a decrease in the partial pressure of the operative material component within the lower pressure space 30 effects an increase in the partial pressure differential and thereby effects an increase in the molar rate at which permeation of a permeating fraction of the higher pressure space-disposed operative material component is being effected through the membrane 20 and into the lower pressure space 30.

In some embodiments, for example, the process further includes supplying a material mixture feed from a material mixture source to the higher pressure space 10 while the permeation of the permeated fraction of the higher pressure space-disposed operative material component is being effected. In some of these embodiments, for example, the material mixture feed includes the operative material component, and the supply of the material mixture feed effects replenishment of the operative material component within the higher pressure space.

In some embodiments, for example, the process further includes at least temporarily suspending the supplying of the material mixture feed prior to the effecting of a decrease in the partial pressure of the operative material component within the lower pressure space 30. In some of these embodiments, for example, the suspension of the supplying of the material mixture feed is effected in response to the sensing of a first permeating operative material component low permeation rate indication.

In some embodiments, for example, the effecting of a decrease in the partial pressure of the operative material component within the lower pressure space 30, by effecting discharge of an operative material component discharge fraction of the operative material component disposed within the lower pressure space 30, from the lower pressure space 30, includes effecting fluid communication with a downstream space 40 defined by a compartment 42, wherein the downstream space pressure within the downstream space 40 is less than a lower pressure space pressure of the lower pressure space. In some of these embodiments, for example, the downstream space pressure is less than atmospheric pressure. In some of these embodiments, for example, the downstream space pressure is less than one atmosphere. In some of these embodiments, for example, the downstream space pressure is generated by a prime mover at the suction of the prime mover. With respect to those embodiments where the material mixture feed is being supplied by a prime mover, and where the supplying of the material mixture feed is at least temporarily suspended prior to the effecting of a decrease in the partial pressure of the operative material component within the lower pressure space 30, in some of these embodiments, for example, the downstream space pressure is generated by the same prior mover that has been effecting the supplying of the material mixture feed to the higher pressure space 10 prior to the suspension of the supplying of the material mixture feed.

In some embodiments, for example, the effecting of a decrease in the partial pressure of the operative material component within the lower pressure space 30, by effecting discharge of an operative material component discharge fraction of the operative material component, disposed within the lower pressure space 30, from the lower pressure space 30, includes effecting evacuation of an operative material component discharge fraction of the operative material component, disposed within the lower pressure space 30, from the lower pressure space 30. In some embodiments, for example, the evacuation is effected by a prime mover.

In some embodiments, for example, the prime mover is a pump. Other suitable prime movers include vacuum pumps and positive displacement blowers.

In some embodiments, for example, the effecting of a decrease in the partial pressure of the operative material component within the lower pressure space 30, by effecting discharge of an operative material component discharge fraction of the operative material component, disposed within the lower pressure space 30, from the lower pressure space 30, includes effecting fluid communication with a downstream space 30, wherein the partial pressure of the operative material component within the downstream space 40 is less than the partial pressure of the operative material component within the lower pressure space 30.

In some embodiments, for example, after the decrease in the partial pressure of the operative material component within the lower pressure space 30, from the pre-discharge pressure, has been effected, permeation of a permeating fraction of the higher pressure space-disposed operative material component is effected while the partial pressure of the operative material component within the lower pressure space 30 is disposed below the pre-discharge pressure. In some of these embodiments, for example, after the decrease in the partial pressure of the operative material component within the lower pressure space, from the pre-discharge pressure, has been effected, and while the permeation of the permeating fraction of the higher pressure space-disposed operative material component is being effected through a membrane 20 and into the lower pressure space 30 while the partial pressure of the operative material component within the lower pressure space 30 is disposed below the pre-discharge pressure, permeation of at least one slower permeating material from the higher pressure space 10, through the membrane 20 and into the lower pressure space 30 is effected.

With respect to those embodiments where the material mixture feed is supplied from a material mixture source to the higher pressure space 10 while the permeation of the permeated fraction of the higher pressure space-disposed operative material component is being effected, in some of these embodiments, for example, after the supplying of the material mixture feed is at least temporarily suspended, and after the decrease in the partial pressure of the operative material component within the lower pressure space 30, from the pre-discharge pressure, has been effected, the process further includes effecting permeation of a permeating fraction of the higher pressure space-disposed operative material component while the partial pressure of the operative material component within lower pressure space 30 is disposed below the pre-discharge pressure. In some of these embodiments, for example, after the decrease in the partial pressure of the operative material component within the lower pressure space 30, from the pre-discharge pressure, has been effected, and while the permeation of the permeating fraction of the higher pressure space-disposed operative material component is being effected through a membrane 20 and into the lower pressure space 30 while the partial pressure of the operative material component within the lower pressure space 30 is disposed below the pre-discharge pressure, the process further includes effecting permeation of at least one slower permeating material from the higher pressure space 10, through the membrane 20 and into the lower pressure space 30.

In some embodiments, for example, after the decrease in the partial pressure of the operative material component within the lower pressure space 30, from the pre-discharge pressure, has been effected, and while the permeation of the permeating fraction of the higher pressure space-disposed operative material component is being effected while the partial pressure of the operative material component within the lower pressure space is disposed below the pre-discharge pressure, the process further includes effecting discharging of an operative material component discharge fraction of the operative material component, disposed within the lower pressure space 30, from the lower pressure space 30.

In some embodiments, for example, after the decrease in the partial pressure of the operative material component within the lower pressure space 30, from the pre-discharge pressure, has been effected, and while the permeation of the permeating fraction of the higher pressure space-disposed operative material component is being effected while the partial pressure of the operative material component within the lower pressure space is disposed below the pre-discharge pressure, a decrease in the partial pressure of the operative material component within the higher pressure space 10 is effected. In some of these embodiments, for example, the decrease in the partial pressure of the operative material component within the higher pressure space 10, which is effected after the decrease in the partial pressure of the operative material component within the lower pressure space 30, from the pre-discharge pressure, has been effected, and while the permeation of a permeating fraction of the higher pressure space-disposed operative material component is being effected while the partial pressure of the operative material component within the lower pressure space 30 is disposed below the pre-discharge pressure, is effected in response to, at least, the permeation of the permeating fraction of the higher pressure space-disposed operative material component that is effected while the partial pressure of the operative material component within the lower pressure space 30 is disposed below the pre-discharge pressure. In some of these embodiments, for example, after the decrease in the partial pressure of the operative material component within the lower pressure space 30, from the pre-discharge pressure, has been effected, and while the permeation of the permeating fraction of the higher pressure space-disposed operative material component is being effected while the partial pressure of the operative material component within the lower pressure space 30 is disposed below the pre-discharge pressure, and while the decrease in the partial pressure of the operative material component within the higher pressure space 10 is being effected, such as in response to, at least, the permeation of a permeating fraction of the higher pressure space-disposed operative material component that is effected while the partial pressure of the lower operative material component within the lower pressure space is disposed below the pre-discharge pressure, the process further includes effecting discharging of an operative material component discharge fraction of the operative material component disposed within the lower pressure space 30, from the lower pressure space 30.

In some of those embodiments where a decrease in the partial pressure of the operative material component within the higher pressure space 10 has been effected in response to the permeation of the permeating fraction of the higher pressure space-disposed operative material component that has been effected while the partial pressure of the operative material component within the lower pressure space 30 is disposed below the pre-discharge pressure, in some of these embodiments, for example, after such a decrease in the partial pressure of the operative material component within the higher pressure space 10, the process further includes effecting increasing of the partial pressure of the operative material component within the higher pressure space 10 from a pre-pressure increase pressure, which thereby effects an increase in the molar rate at which the permeation of the permeating fraction of the higher pressure space-disposed operative material component is being effected through the membrane 20 and into the lower pressure space 30. In some of these embodiments, for example, the increase in the partial pressure of the operative material component within the higher pressure space 10 is effected by supplying of the material mixture feed. In some of these embodiments, for example, the supplying of the material mixture feed is effected by a prime mover. In some of these embodiments, for example, the supplying of the material mixture feed, for the effecting of the increase in the partial pressure of the operative material component within the higher pressure space 10, is effected in response to the sensing of a second operative material component low permeation rate indicator. In some of these embodiments, for example, the second operative material component low permeation rate indicator is a low higher pressure space-disposed operative material component partial pressure indication.

In some of these embodiments, for example, the low higher pressure space-disposed operative material component partial pressure indication is a pressure that is below a predetermined minimum pressure within the higher pressure space 10. In some of these embodiments, for example, after the effecting of an increase in the partial pressure of the operative material component within the higher pressure space 10, from the pre-pressure increase pressure, and while the partial pressure of the operative material component within the higher pressure space 10 is disposed above the pre-pressure increase pressure, permeation of a permeating fraction of the higher pressure space-disposed operative material component through the membrane 20 and into the lower pressure space 30 is effected. In some of these embodiments, for example, after the effecting of an increase in the partial pressure of the operative material component within the higher pressure space 10, from the pre-pressure increase pressure, and while the partial pressure of the operative material component within the higher pressure space 10 is disposed above the pre-pressure increase pressure, the permeation of the permeating fraction of the higher pressure space-disposed operative material component through the membrane 20 and into the lower pressure space 30 is effected in response to, at least, a second cycle partial pressure differential between the partial pressure of the operative material component within the higher pressure space 10 and the partial pressure of the operative material component within the lower pressure space 30.

In some of those embodiments where a decrease in the partial pressure of the operative material component within the higher pressure space 10 has been effected in response to the permeation of the permeating fraction of the higher pressure space-disposed operative material component that is effected while the partial pressure of the operative material component within the lower pressure space 30 is disposed below the pre-discharge pressure, in some of these embodiments, for example, after such a decrease in the partial pressure of the operative material component within the higher pressure space 10, the process further includes effecting restarting of the supplying of the material mixture feed, such that an increase in partial pressure of the operative material component within the higher pressure space 10 is effected from a pre-pressure increase pressure, which thereby effects an increase in the molar rate at which the permeation of the permeating fraction of higher pressure space-disposed operative material component is being effected through the membrane 20 and into the lower pressure space 30. In some of these embodiments, for example, the supplying of the material mixture feed is effected by a prime mover. In some of these embodiments, for example, the restarting of the supplying of the material mixture feed is effected in response to the sensing of a second operative material component low permeation rate indicator. In some of these embodiments, for example, the second operative material component low permeation rate indicator is a low higher pressure space-disposed operative material component partial pressure indication. In some of these embodiments, for example, the low higher pressure space-disposed operative material component partial pressure indication is a pressure that is below a predetermined minimum pressure within the higher pressure space 10. In some of these embodiments, for example, after the restarting of the supplying of the material mixture feed, and while the partial pressure of the operative material component within the higher pressure space 10 is disposed above the pre-pressure increase pressure, permeation of a permeating fraction of the higher pressure space-disposed operative material component through the membrane 20 and into the lower pressure space 30 is effected. In some of these embodiments, for example, after the restarting of the supplying of the material mixture feed, and while the partial pressure of the operative material component within the higher pressure space 10 is disposed above the pre-pressure increase pressure, the permeation of the permeating fraction of the higher pressure space-disposed operative material component through the membrane 20 and into the lower pressure space 30 is effected in response to, at least, a second cycle partial pressure differential between the partial pressure of the operative material component within the higher pressure space 10 and the partial pressure of the operative material component within the lower pressure space 30.

In some embodiments, for example, the prime mover is a pump. Other suitable prime movers include vacuum pumps and positive displacement blowers.

In some of those embodiments where increasing of the partial pressure of the operative material component within the higher pressure space 10 from a pre-pressure increase pressure has been effected after a decrease in the partial pressure of the operative material component within the higher pressure space 10 has been effected in response to the permeation of the permeating fraction of the higher pressure space-disposed operative material component that has been effected while the partial pressure of the operative material component within the lower pressure space 30 is disposed below the pre-discharge pressure, in another aspect, for example, prior to the supplying of the material mixture feed for effecting an increase in the partial pressure of the operative material component within the higher pressure space 10, the process further includes effecting discharging of at least a fraction of material remaining within the higher pressure space 10. In some of these embodiments, for example, the material remaining within the higher pressure space 10 is that material remaining within the higher pressure space 10 after the decrease in the partial pressure of the operative material component within the higher pressure space 10 has been effected in response to the permeation of the permeating fraction of the higher pressure space-disposed operative material component that is effected while the partial pressure of the operative material component within the lower pressure space 30 is disposed below the pre-discharge pressure and while the discharging of an operative material component discharge fraction of the operative material component disposed within the lower pressure space 30 is being effected. In some of these embodiments, for example, the combination of the discharging of at least a fraction of material remaining within the higher pressure space 10, followed by the supplying of the material mixture feed for effecting an increase in the partial pressure of the operative material component within the higher pressure space 10, is effected in response to the sensing of a second operative material component low permeation rate indicator. In some of these embodiments, for example, the discharging of at least a fraction of material remaining within the higher pressure space 10 is effected in response to a target material concentration indicator that is sensed within the higher pressure space 10. In this respect, in some embodiments, for example, the target material is a material that is a slower-permeating material whose molar concentration within the higher pressure space 10 has increased prior to the discharging of at least a fraction of material remaining within the higher pressure space 10, by virtue of its slower permeation characteristics relative to other materials within the operative material mixture.

In some of those embodiments where restarting of the supplying of the material mixture feed, such that an increase in partial pressure of the operative material component within the higher pressure space 10 has been effected from a prepressure increase pressure, has been effected after a decrease in the partial pressure of the operative material component within the higher pressure space 10 has been effected in response to the permeation of the permeating fraction of the higher pressure space-disposed operative material component that has been effected while the partial pressure of the operative material component within the lower pressure space 30 is disposed below the pre-discharge pressure, in another aspect, for example, prior to the restarting of the supplying of the material mixture feed for effecting an increase in the partial pressure of the operative material component within the higher pressure space 10, at least a fraction of material remaining within the higher pressure space 10 is discharged. In some embodiments, for example, the material remaining within the higher pressure space 10 is that material remaining within the higher pressure space 10 after the decrease in the partial pressure of the operative material component within the higher pressure space 10 has been effected in response to the permeation of the permeating fraction of the higher pressure space-disposed operative material component that is effected while the partial pressure of the operative material component within the lower pressure space 30 is disposed below the pre-discharge pressure and while the discharging of an operative material component discharge fraction of the operative material component disposed within the lower pressure space 30 is being effected. In some embodiments, for example, the combination of the discharging of at least a fraction of material remaining within the higher pressure space 10, followed by the restarting of the supplying of the material mixture feed, is effected in response to the sensing of a second operative material component low permeation rate indicator. In some of these embodiments, for example, the discharging of at least a fraction of material remaining within the higher pressure space is effected in response to a target material concentration indicator that is sensed within the higher pressure space 10. In this respect, in some embodiments, for example, the target material is a material that is a slower-permeating material whose molar concentration within the higher pressure space 10 has increased prior to the discharging of at least a fraction of material remaining within the higher pressure space 10, by virtue of its slower permeation characteristics relative to other materials within the operative material mixture.

Also in some of those embodiments where increasing of the partial pressure of the operative material component within the higher pressure space 10 from a pre-pressure increase pressure has been effected after a decrease in the partial pressure of the operative material component within the higher pressure space 10 has been effected in response to the permeation of the permeating fraction of the higher pressure space-disposed operative material component that has been effected while the partial pressure of the operative material component within the lower pressure space 30 is disposed below the pre-discharge pressure, in some of these embodiments, for example, the supplying of the material mixture feed, for effecting an increase in the partial pressure of the operative material component within the higher pressure space 10, is effected after the discharging of an operative material component discharge fraction of the operative material component disposed within the lower pressure space 30 is at least temporarily suspended. In some of these embodiments, for example, the supplying of the material mixture feed, for effecting an increase in the partial pressure of the operative material component within the higher pressure space 10, is effected after sealing of the fluid communication, between the lower pressure space 30 and the downstream space 40, that has been effecting the discharging of an operative material component discharge fraction of the operative material component disposed within the lower pressure space 30. In some of these embodiments, for example, the downstream space pressure of the downstream space 40 is defined by the suction of a prime mover that is the same prime mover that is effecting the supplying of the material mixture feed.

Also in some of those embodiments where restarting of the supplying of the material mixture feed, such that an increase in partial pressure of the operative material component within the higher pressure space 10 has been effected from a prepressure increase pressure, has been effected after a decrease in the partial pressure of the operative material component within the higher pressure space 10 has been effected in response to the permeation of the permeating fraction of the higher pressure space-disposed operative material component that has been effected while the partial pressure of the operative material component within the lower pressure space 30 is disposed below the pre-discharge pressure, in some of these embodiments, for example, the restarting of the supplying of the material mixture feed is effected after the discharging of an operative material component discharge fraction of the operative material component disposed within the lower pressure space 30 is at least temporarily suspended. In some of these embodiments, for example, the supplying of the material mixture feed, for effecting an increase in the partial pressure of the operative material component within the higher pressure space 10, is effected after sealing of the fluid communication, between the lower pressure space 30 and the downstream space 40, that has been effecting the discharging of an operative material component discharge fraction of the operative material component disposed within the lower pressure space 30. In some of these embodiments, for example, the downstream space pressure of the downstream space 40 is generated by, and at the suction of the prime mover that is the same prime mover that is effecting the supplying of the material mixture feed.

In another aspect, the effecting of the permeation of the permeating fraction of the higher pressure space-disposed operative material component through the membrane 20 and into the lower pressure space 30 after the effecting of an increase in the partial pressure of the operative material component within the higher pressure space 10, from the prepressure increase pressure, and while the partial pressure of the operative material component within the higher pressure space 10 is disposed above the pre-pressure increase pressure, defines completion of a process cycle, and the process cycle is repeated at least once.

In a further aspect, the effecting of the permeation of the permeating fraction of the higher pressure space-disposed operative material component through the membrane 20 and into the lower pressure space 30 after the restarting of the supplying of the material mixture feed and while the partial pressure of the operative material component within the higher pressure space 10 is disposed above the pre-pressure increase pressure, defines completion of a process cycle, and the process cycle is repeated at least once.

In some embodiments, for example, the permeation process is for effecting separation of an oxygen-enriched separation fraction from air, such that the operative mixture is air, the operative material component is diatomic oxygen ($O_2$) and one of the at least another material component is diatomic nitrogen ($N_2$). In other embodiments, for example, the permeation process is for effecting separation of a $CO_2$—enriched separation fraction from a gaseous effluent discharged from a combustion process, such that the operative mixture is the gaseous effluent, the operative material component is carbon dioxide ($CO_2$), and one of the at least another components is diatomic oxygen ($O_2$).

Figure 2A:
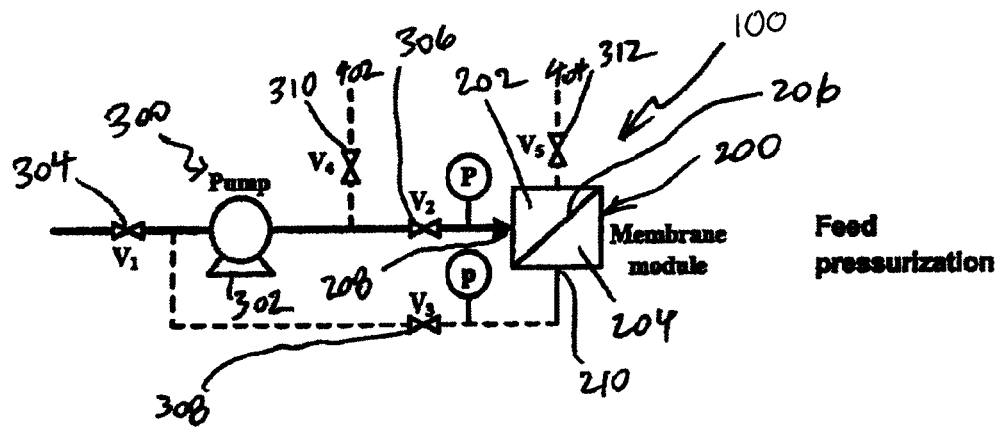
FIG. 2A is a schematic illustration of a system in which is practiced another embodiment of the process, and particularly illustrating a configuration of the system during the feed pressurization step of the process embodiment.
Figure 2B:
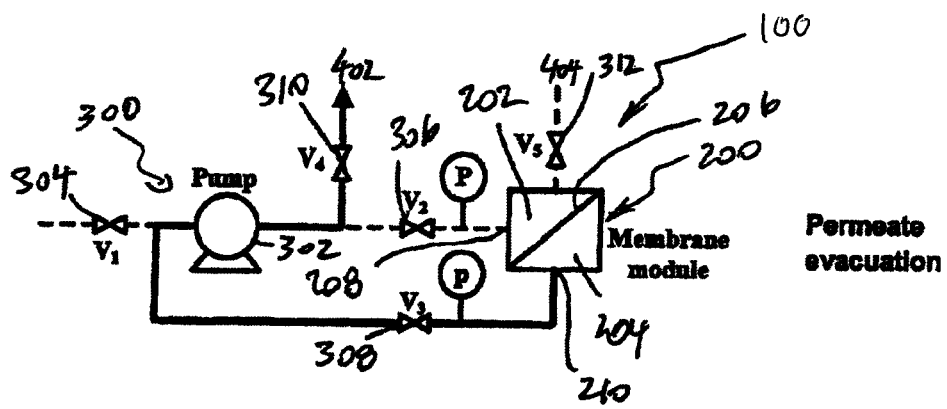
FIG. 2B is a schematic illustration of the system of FIG. 1A, and particularly illustrating a configuration of the system during the permeate evacuation step of the process embodiment of FIG. 1A.
Figure 2C:
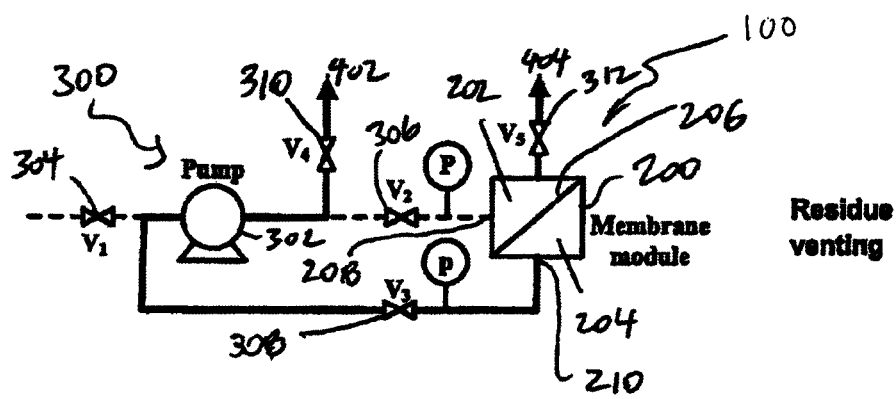
FIG. 2C is a schematic illustration of the system of FIG. 1A, and particularly illustrating a configuration of the system during the residue venting step of the process embodiment of FIG. 1A.

In some embodiments, for example, and referring to FIGS. 2A, 2B and 2C, the process involves sequential steps of feed pressurization (see FIG. 2A), feed admission/permeation, switchover from feed admission to evacuation, permeation/permeate evacuation (see FIG. 2B), and residue venting (see FIG. 2C). This sequence of steps can be repeated continuously, such that the method includes multiple cycles, each cycle being defined by this sequence of steps. In some embodiments, for example, the process is practiced in a system 100 including a membrane module 200 and a pressure swing sub-system 300.

The membrane module 200 includes the higher pressure space 202 and the lower pressure space 204. The higher pressure space 202 (or "feed side") is disposed in mass transfer communication with the lower pressure space 204 (or "permeate side"), through a membrane 206.

The higher pressure space 202 defines a fixed volume $V_F$. The lower pressure space 204 defines a fixed volume $V_M$. The membrane module 200 further includes an inlet 208 for effecting supply of the material mixture feed to the higher pressure space 202, and an outlet 210 for effecting discharge of material from the lower pressure space 204.

The pressure swing sub-system 300 includes a pump 302. During a time fraction of the process, the pump 302 is operational to effect supply of the material mixture feed to the higher pressure space 202 and thereby effect pressurization of the higher pressure space 202. During another time fraction of the method, the pump is operational to effect evacuation of material disposed within the lower pressure space 204. In this respect, the sub-system 300 includes a valve 304 for selectively interfering with fluid communication between the pump and a source 400 of material mixture feed, and also a valve 306 for selectively interfering with fluid communication between the pump 302 and the higher pressure space 202. In combination, the valves 304 and 306 regulate the supply of the material mixture feed to the higher pressure space 202. The subsystem 300 also includes a valve 308 for selectively interfering with fluid communication between the lower pressure space 204 and the pump 302, and a valve 310 for selectively interfering with fluid communication between the pump 302 and a first product outlet 402. In combination, the valves 308, 310 regulate the discharge of material from the lower pressure space 204, from the process. The subsystem further includes a valve 312 for selectively interfering with fluid communication between the higher pressure space 202 and a second product outlet 404. and thereby regulating discharge of material from the higher pressure space, from the process.

Figure 3:
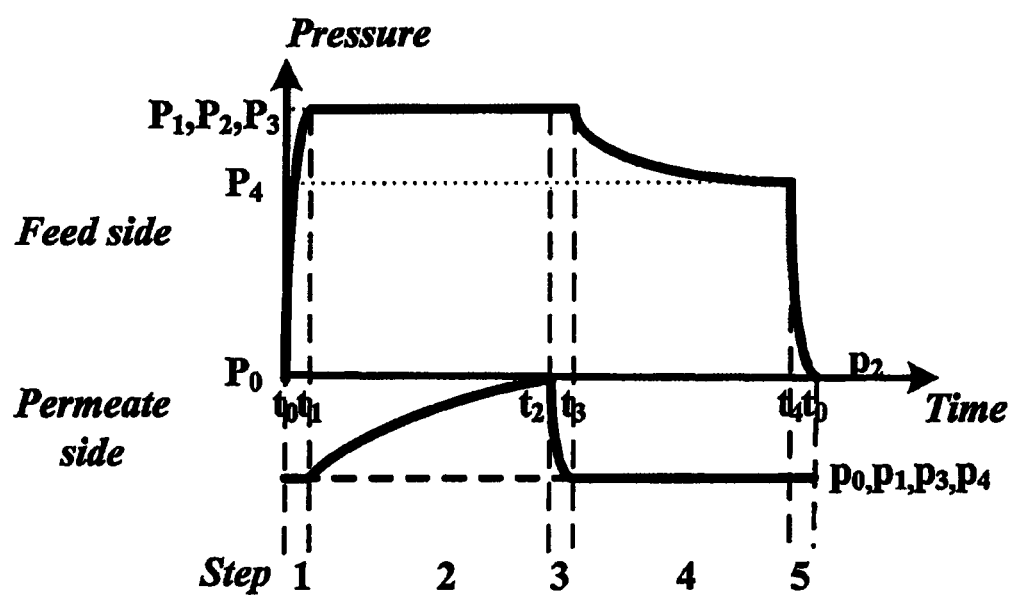
FIG. 3 is a schematic illustration of the pressure profiles of the higher pressure (feed side) and lower pressure (permeate side) spaces over a complete cycle of the process embodiment of FIG. 2A.

Pressure profiles of the permeate and feed sides 204, 202, over a complete cycle, are schematically shown in FIG. 3. In Step 1 (from time $t_8$ to $t_1$), which is referred to as "feed pressurization", the feed side 202 (volume vf) is quickly charged with a pressurized gas by using the pump 302 (which functions as a compressor) to reach a pressure of $P_1 = P_h$, and permeation begins to occur under the transmembrane pressure difference. Referring to FIG. 2A, during feed permeation, valves 304 and 306 are opened, and valves 308, 310, and 312 are closed. As permeation proceeds with time, the feed is supplied continuously to maintain a constant pressure $P_h$, whereas the pressure on the permeate side 204 gradually increases due to accumulation of the permeate. During this period (from time $t_1$ to $t_2$), which is called the "feed admission/permeation" step (Step 2), the driving force for permeation decreases with time. This step is terminated when the permeate pressure reaches a certain predetermined maximum value (such as 1 atmosphere) at time $t_2$. At this point, the feed admission is stopped, and the pump is now switched over to function as a vacuum pump, effecting the discharge of the permeate accumulated within the permeate side 204. In response, the permeate pressure quickly drops to a lower level. This step (from time $t_2$ to $t_3$, Step 3) is characterized by the switching of the pump 302 from a compression mode to an evacuation mode, so as to provide a boost to the transmembrane pressure difference. Step 3 occurs rapidly so that $P_3 \approx P_2$. During the switching of the pump 302 from a compression mode to an evacuation mode, the possibility for product contamination exists, owing to the fact that during this switching, valve 306 is closed and valves 308, 310 are opened so as to effect discharge of permeate through the outlet 402 (see FIG. 2B). Thereafter, the permeate evacuation continues while maintaining a low pressure Pv, and the permeate is continuously withdrawn and collected. During this step (Step 4, from time $t_3$ to $t_4$), which is called the "permeation/permeate evacuation" step, the pressure on the feed side 202 begins to decrease because of the permeation. At time $t_4$, when the pressure on the feed side 202 is sufficiently low that the permeation will no longer be effective for gas separation, or when the concentration of the residue has reached its target value required for the residue product, the residue will be vented and collected at pressure $P_0$. This step, from time $t_4$ to $t_5$, is called "residue venting" (Step 5). Referring to FIG. 2C, during residue venting, valves 308, 310, and 312 remain opened, and valves 304 and 306 remain closed. These sequential operating steps, which represent one cycle of the pressure-vacuum swing permeation, are repeated to accomplish gas separation continuously and in cyclic fashion. Steps 2 and 4 are responsible for separation, while the other steps can be completed very quickly, and for the sake of simplicity, the duration of these steps have been neglected in the parametric studies described below.

By taking advantage of the feed pressurization and permeate evacuation during the process, a relatively high pressure difference (P–p) across the membrane is achieved. It is the enhanced transmembrane pressure difference that will lead to increased productivity because of the relatively high driving force for permeation. Furthermore, it is well known that the degree of enrichment in gas separation is also a function of the feed to permeate pressure ratio, and a high (P/p) pressure ratio, obtained by using both the permeate evacuation and feed pressurization (which can be accomplished by using a single pump), enhances the gas separation. This can be illustrated by the following example. Consider a conventional membrane process for oxygen enrichment from air where the feed side is at atmospheric pressure and the permeate is maintained at 0.1 atmospheres using a blower, the pressure difference across the membrane and the feed to permeate pressure ratio are 0.9 atmospheres and 10 atmospheres, respectively. When the pressure-vacuum swing permeation is used, if the average feed pressure can be elevated to four (4) atmospheres, the transmembrane pressure difference and the feed/permeate pressure ratio can be increased by a multiple of four (4) without using additional equipment except for a few switching valves. It may be pointed out that in the pressure-vacuum swing permeation assisted with a single pump, diaphragm pumps or other commonly used positive displacement pumps are preferred to handle both compression and evacuation. In some embodiments, for example, the swing permeation process proposed here appears to be suitable for such applications that operate preferably at moderate feed pressures as air separation for oxygen enrichment or flue gas separation for CO2 capture.

An analysis of the permeation behaviour of this exemplary embodiment of the process is now discussed, as applied to air separation.

To formulate mathematical equations for parametric analyses, the following assumptions are made:
(1) Isothermal operation. There is no change in temperature during the process.
(2) Ideal gas behavior.
(3) The time lag of permeation due to transient transmission of gas molecules through the membrane is negligible. The permeate is thus assumed to be received on the permeate side as soon as permeation takes place.
(4) The permselectivity of the membrane is independent of gas composition and pressure.
(5) The membrane permeability during the cyclic operation is the same as that at steady state.
(6) The gas on the feed side is perfectly mixed, that is, the concentration on the membrane surface is the same as the bulk concentration of the feed.
(7) On the permeate side, there is no back diffusion from the bulk permeate to the membrane surface.

For the purpose of parametric studies, air separation for oxygen enrichment is considered here as a model system to demonstrate the effectiveness of pressure-vacuum swing permeation. For example, in the case of air separation by membranes, this is normally carried out at a relatively low feed pressure.

Step 1: Feed Pressurization

The feed pressurization step is usually very short, and the permeation can be considered to be negligible. The feed gas with a concentration $X_F$ (mole fraction of fast component, i.e., oxygen in air separation) is quickly admitted to the feed side of the membrane system (with a volume of $V_F$) to reach a total pressure of $P_1$. The feed side initially contains a portion of the residue gas (at a pressure of $P_0$ and with a concentration of $X_0$) left from the previous cycle of operation. The concentration of the gas mixture on the feed side at time $t_1$ is given, based on materials balance, by $$X_1 = X_F + \frac{P_0}{P_1}(X_0 - X_F) \tag{1}$$

where $X_0 = X_4$. For air separation, the residue venting occurs conveniently at atmospheric pressure, and thus $P_0 = 101$ kPa is used in the study.

Step 2: Feed Admission/Permeation

Figure 4:
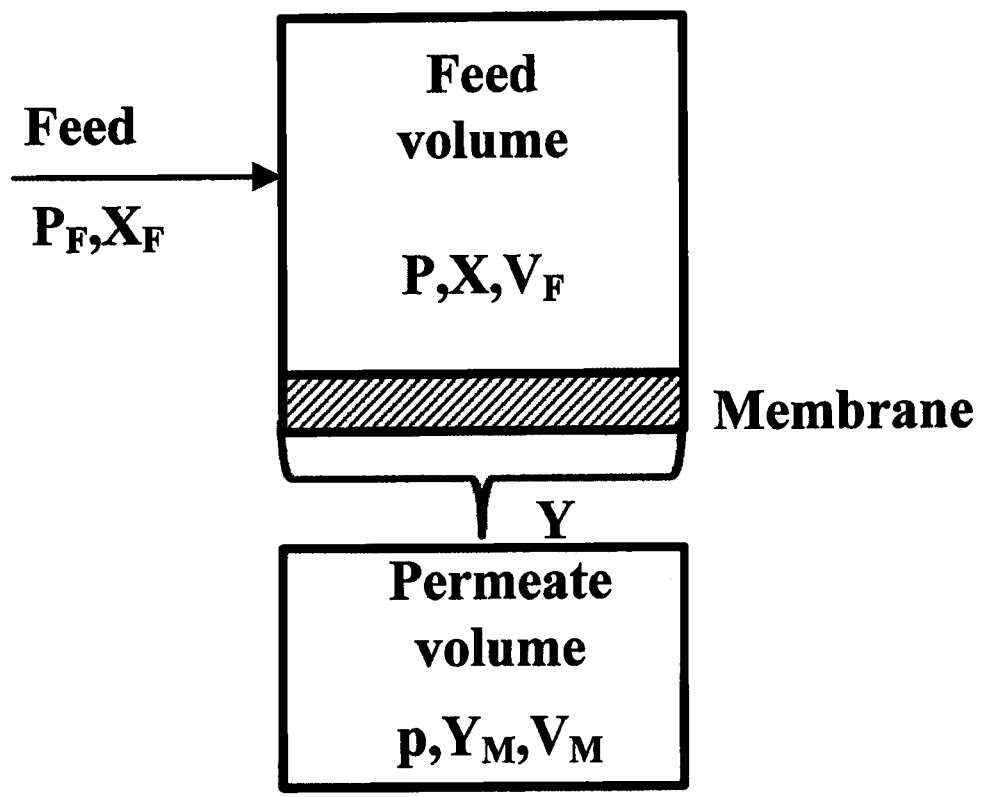
FIG. 4 is a schematic illustration of a permeation system with constant feed pressure and varying permeate pressure.

Consider a permeation system shown in FIG. 4 that is relevant to this step (from time $t_1$ to $t_2$) of the cyclic pressure-vacuum swing process. The feed gas is continuously supplied to maintain a constant pressure of $P_1 = P_h$ without removing any retentate on the feed side. Permeation takes place in a fashion similar to the "dead end" permeation, and the permeate is accumulated at the permeate side. For the separation of a binary gas mixture, the permeation rate at a given instant can be written as $$\frac{dQ_A}{dt} = J_A A(PX - pY) \tag{2}$$

$$\frac{dQ_B}{dt} = J_B A[P(1-X) - p(1-Y)] \tag{3}$$

where Q is the quantity of the permeate, J is the gas permeance of the membrane, and A is the membrane area for permeation. The subscripts A and B represent the fast (e.g., oxygen) and slow (e.g., nitrogen) permeating components of the binary gas mixture, respectively. X is the gas concentration on the feed side feed, and Y is the concentration of permeate on the membrane surface. Both quantities are expressed in terms of the mole faction of the fast permeating component. The local concentration of permeate leaving the membrane surface is determined by the relative permeation rates of the two permeating components. This is especially the case for asymmetric membranes where the microporous substrate prevents local mixing. Thus, Y can be calculated by $$Y = \frac{\left(\frac{dQ_A}{dt}\right)}{\left(\frac{dQ_A}{dt} + \frac{dQ_B}{dt}\right)} \tag{4}$$

Since a constant pressure is maintained on the feed side and no residue is withdrawn during permeation, the molar flow rate of gas fed to the feed side of the permeator is equal to the molar permeation rate. On the basis of materials balance, the gas concentration on the feed side X at a given instant is related to $X_1$ and $X_F$ by $$X = \frac{\left(\frac{PV_F}{RT}\right)X_1 + (Q_A + Q_B)X_F - Q_A}{PV_F/RT} \tag{5}$$

The bulk concentration of the permeate, $Y_M$, is determined by the overall quantity of the gases accumulated and is given by $$Y_M = \frac{Q_A + \left(\frac{P_V V_M Y_{M1}}{RT}\right)}{Q_A + Q_B + \left(\frac{P_V V_M}{RT}\right)} \tag{6}$$

where $V_M$ is the volume on the permeate side, $P_V$ is the permeate pressure when the permeate side is evacuated, and $Y_{M1}$ is the concentration of the residual permeate retained from previous step ($Y_{M1} = Y_{M0} = Y_{M4}$). When the vacuum level is sufficiently high, the amount of the residual permeate left from the previous step is negligible and $Y_M$ can thus be simplified as $$Y_M = \frac{Q_A}{Q_A + Q_B} \tag{6a}$$

The pressure change with time on the permeate side is related to the permeation rate by $$\frac{dp}{dt} = \left(\frac{dQ_A}{dt} + \frac{dQ_B}{dt}\right)\frac{RT}{V_M} \tag{7}$$

Equations (2) to (7) constitute an initial value problem. The quantities p, X, Y, $Q_A$, $Q_B$ and $Y_M$ at any instant can be determined by solving these equations for a given set of initial conditions. For the purpose of parametric analyses, the following numerical values with respect to membrane properties and operating conditions were chosen in the calculations:

Oxygen permeance: $J_A = 1 \times 10^{-5}$ cm³(STP)/(cm²·s·cmHg)

$O_2/N_2$ selectivity: $J_A/J_B = 6$

Membrane area: $A = 100$ m²

Permeator volume occupied by permeate: $V_M = 0.005$, 0.01, and 0.02 m³

Target value of $O_2$ product concentration: $Y_{M4} = 0.45$

Temperature: $T = 298$ K

The above numerical values of the membrane area and permeate volume were chosen based on the typical membrane areas packing densities of hollow fiber modules. With typical fiber dimensions, the membrane area per module volume is in the range of 6,000 to 13,000 m²/m³. Moreover, the shell side void volume is close to the tube side void volume [Feng X, Pan C Y and Ivory J. Pressure swing permeation: Novel process for gas separation by membranes. *AIChE J.* 46, 724-733 (2000)], that is $V_M \approx V_F$. However, when hollow fiber modules are used, an additional external vessel may be used on either the feed or permeate side for gas storage in order to slow down oxygen depletion on the feed side or to slow down the pressure buildup on the permeate side. Unless specified otherwise, an equal volume of $V_M$ and $V_F$ are used in the calculations. Three important quantities are to be evaluated: the pressure of permeate, the concentration of $O_2$ in the permeate, and the concentration of $N_2$ in the residue. The what follows the calculated results on how they vary with time are illustrated and discussed.

Figures 5A, 5B, 5C:
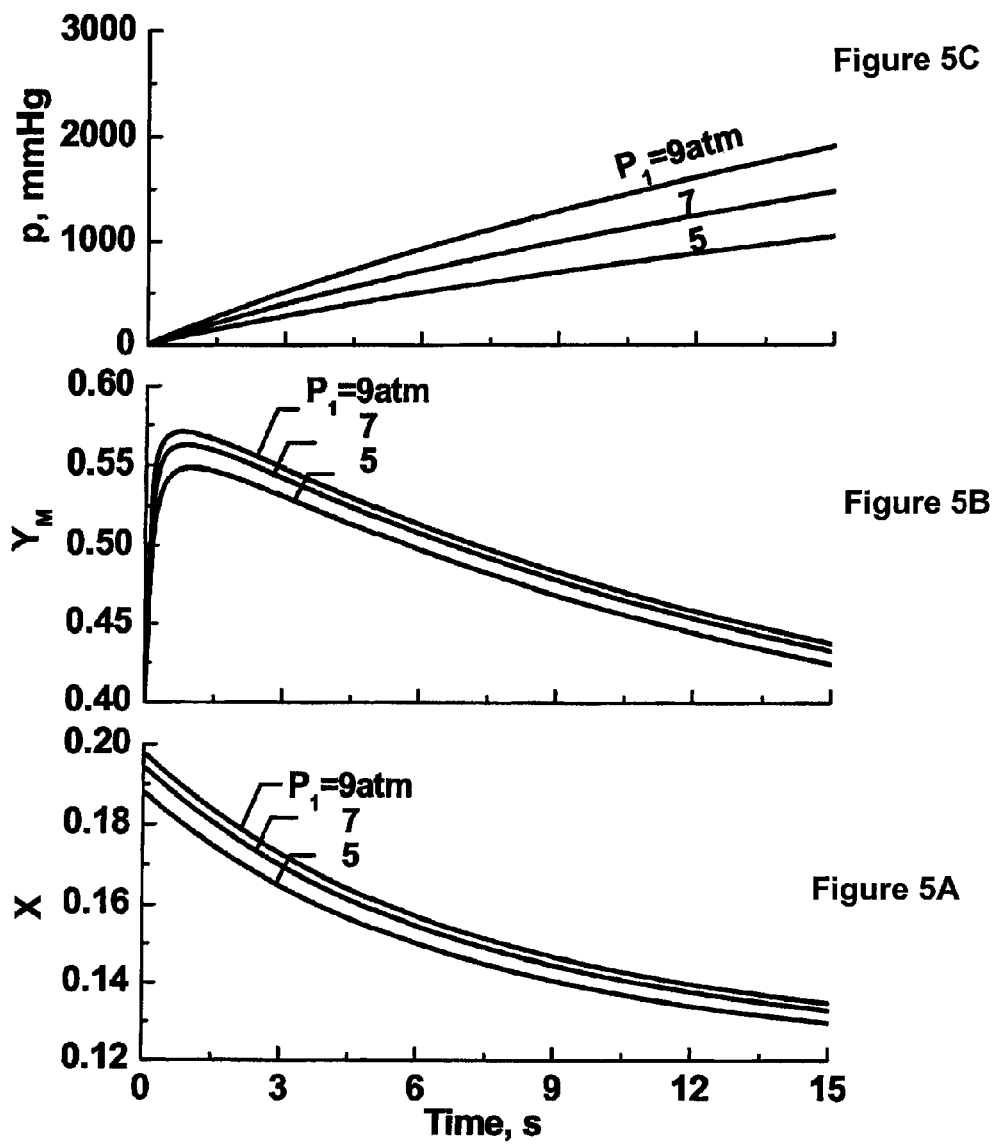
FIG. 5A is a graph illustrating residue $O_2$ concentration at different pressures $P_1$ as a function of time for Step 2 of the pressure-vacuum swing permeation process being practiced in the system of FIG. 4, for $p_v$=10 mmHg, $V_F$=$V_M$=V, and (A/V)=10,000 $m^2/m^3$.
FIG. 5B is a graph illustrating permeate $O_2$ bulk concentration at different pressures $P_1$ as a function of time for Step 2 of the pressure-vacuum swing permeation process being practiced in the system of FIG. 4, for $p_v$=10 mmHg, $V_F$=$V_M$=V, and (A/V)=10,000 $m^2/m^3$.
FIG. 5C is a graph illustrating permeate pressure at different pressures $P_1$ as a function of time for Step 2 of the pressure-vacuum swing permeation process being practiced in the system of FIG. 4, for $p_v$=10 mmHg, $V_F$=$V_M$=V, and (A/V)=10,000 $m^2/m^3$.

FIG. 5 shows the instantaneous permeate pressure, permeate composition and residue composition at different feed pressures ($P_1$). As expected, with permeation proceeding with time, the residue is gradually depleted in oxygen, and the permeate pressure increases. Interestingly, the concentration of oxygen in the permeate initially increases and then decreases. This is because the space for receiving the permeate is initially filled with residual permeate left from the previous step at a lower concentration. The accumulation of the "freshly" produced permeate, which is at a higher concentration, will lead to an increase in the overall permeate concentration. However, as permeation continues, the transmembrane pressure difference gradually decreases due to buildup of permeate pressure, and the reduction in the driving force for oxygen permeation will be more significant than the reduction in the driving force for nitrogen permeation. As a result, the concentration of oxygen in the permeate leaving the membrane surface gradually decreases with time, causing a reduction in the bulk concentration of oxygen in the permeate. FIG. 5 also shows that an increase in feed pressure $P_1$ tends to increase the oxygen concentration in the permeate, indicating that a higher feed pressure favors oxygen enrichment. On the other hand, the molar permeation rate equals the feeding rate during the course of permeation. As a result, for a given amount of oxygen-enriched air going to the permeate, an equal number of moles of air is supplied at the feed side. As such, a higher feed pressure, which causes faster permeation, will result in a higher oxygen concentration in the residue (as shown in FIG. 5), making it less favorable for nitrogen production from a purity point of view. For conventional air separation, a feed pressure of 700-1000 kPa is often used with feed pressurization, and a permeate pressure of 10-25 kPa is generally used if permeate evacuation is used. It appears that for the situation considered here, a variation in the feed pressure $P_1$ from 400 to 800 kPa does not dramatically affect the residue and the permeate compositions. In the following studies $P_1 = 710$ kPa was used.

FIG. 6 illustrates how the separation performance is influenced by the quantity (A/V), where A is the membrane area and V is the volume of the permeator for feed or permeate "storage" (assuming $V_F$ and $V_M$ are the same and equal to V). Parameters A and V are independent, but they do not affect the separation behavior as long as their ratio (A/V) is kept constant. The (A/V) ratio is thus used here as a single variable to show their combined effects on the separation performance. When other operating conditions are the same, an increase in the (A/V) ratio will yield a higher permeate pressure but at the expenses of lowering oxygen concentration if the permeation time is sufficiently long, although the permeate concentration initially increases with an increase in (A/V). This is consistent with the earlier observation on the effects of feed pressure $P_1$. An increase in (A/V) means an increase in the membrane area packing density, which increases the overall permeation rate. It appears that as permeation proceeds, the higher the value of (A/V) is, the sooner the maximum in the permeate oxygen concentration will be reached. Unfortunately, the maximum permeate oxygen concentration is attained within only a couple of seconds. It will be inappropriate to terminate this step when the maximum permeate concentration is reached, because the pressure-vacuum swing process will need to be operated at a cycle frequency that is too fast for practical use. However, for a given membrane module, when the (A/V) ratio is too high based on the internal space of the permeator, an external gas tank may be used in order to attain a proper (A/V) value. On the other hand, the data in FIG. 6 also suggest that if the primary objective of the separation is to remove $O_2$ from air for nitrogen generation, it will be more advantageous to use a higher value of (A/V) in order to produce a higher purity of nitrogen in the residue.

Figure 7C:
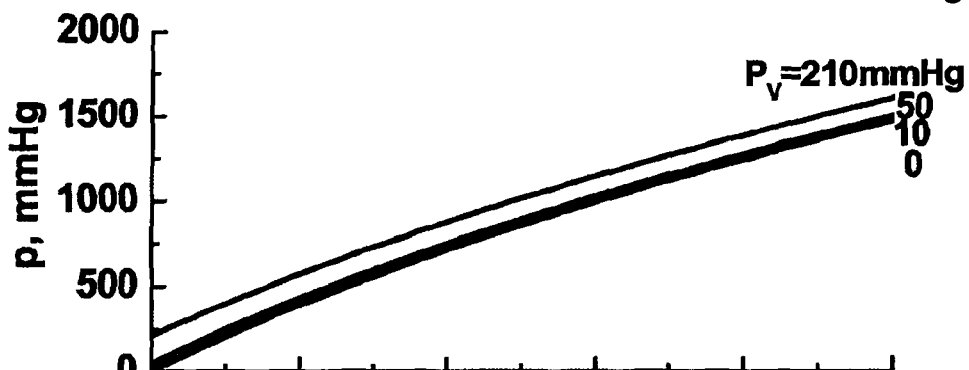
FIG. 7C is graph illustrating permeate pressure at different $p_v$ values as a function of time for Step 2 of the pressure-vacuum swing permeation process being practiced in the system of FIG. 4, for $P_1$=7 atm, $V_F$=$V_M$=V, and (A/V)=10,000 $m^2/m^3$.
Figure 7B:
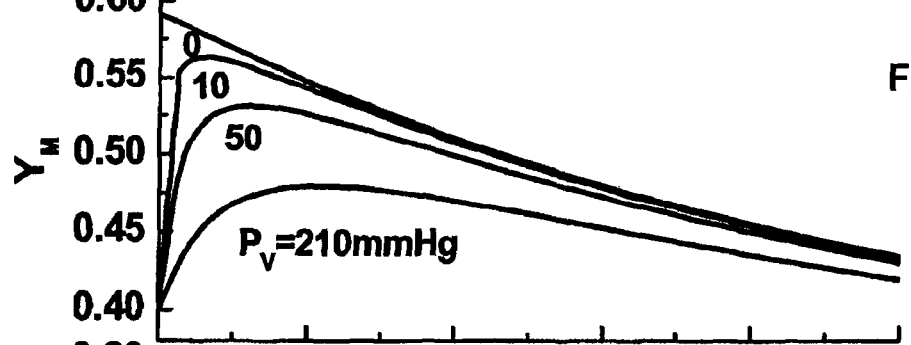
FIG. 7B is a graph illustrating permeate $O_2$ bulk concentration at different $p_v$ values as a function of time for Step 2 of the pressure-vacuum swing permeation process being practiced in the system of FIG. 4, for $P_1$=7 atm, $V_F$=$V_M$=V, and (A/V)=10,000 $m^2/m^3$.
Figure 7A:
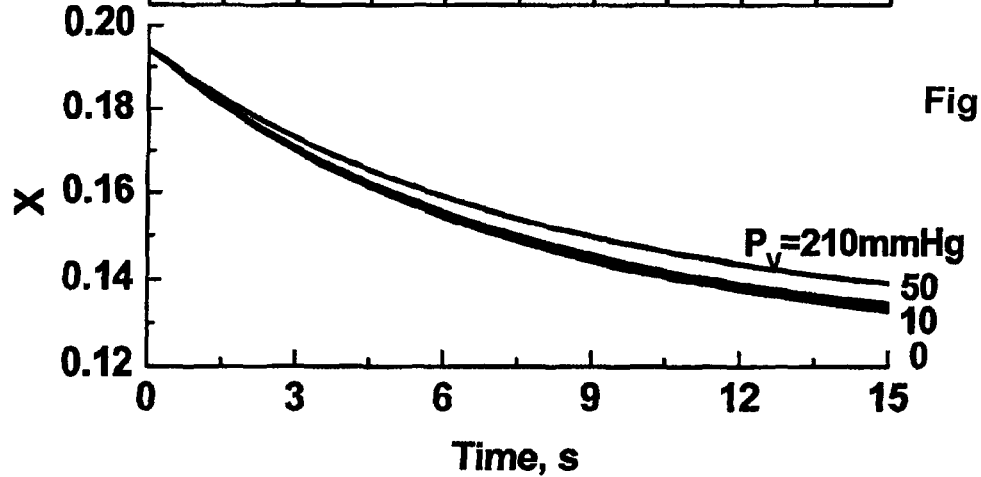
FIG. 7A is a graph illustrating residue $O_2$ concentration at different $p_v$ values as a function of time for Step 2 of the pressure-vacuum swing permeation process being practiced in the system of FIG. 4, for $P_1$=7 atm, $V_F$=$V_M$=V, and (A/V)=10,000 $m^2/m^3$.

FIG. 7 shows that $p_v$, which is the permeate pressure when the permeate side is evacuated, has little effects on the separation performance during this process step if the permeation is allowed to last for more than 10 s. This means that the commonly used diaphragm vacuum/pressure pumps will be adequate for the pressure-vacuum swing permeation process because a moderate vacuum level will be adequate. Therefore, a $p_v$ value of 28 kPa will be used in the following to represent a conservative case.

Figure 8C:
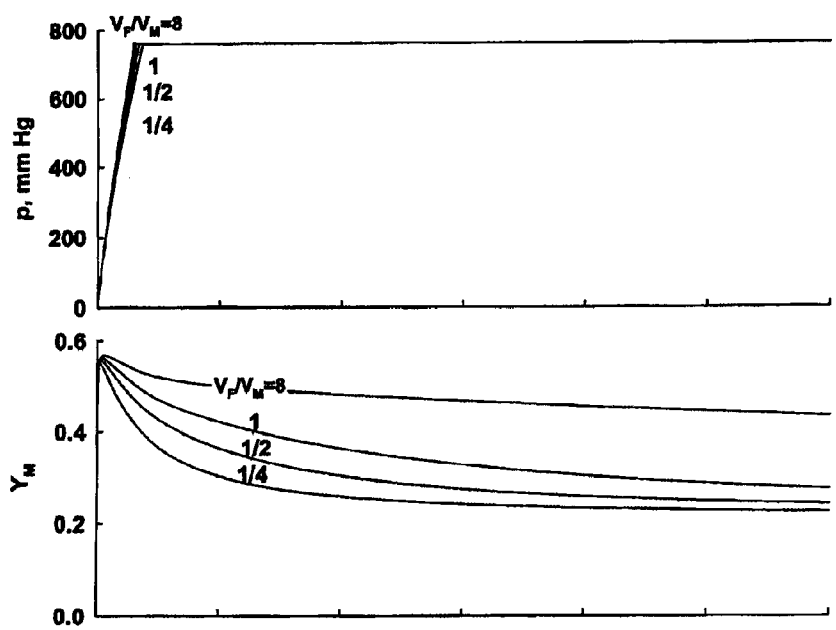
FIG. 8C is a graphs illustrating permeate pressure at different ($V_F/V_M$) values as a function of time for Step 2 of the pressure-vacuum swing permeation process being practiced in the system of FIG. 4, for $P_1$=7 atm, $p_v$=10 mmHg, and (A/$V_M$)=10,000 $m^2/m^3$.
Figure 8B:
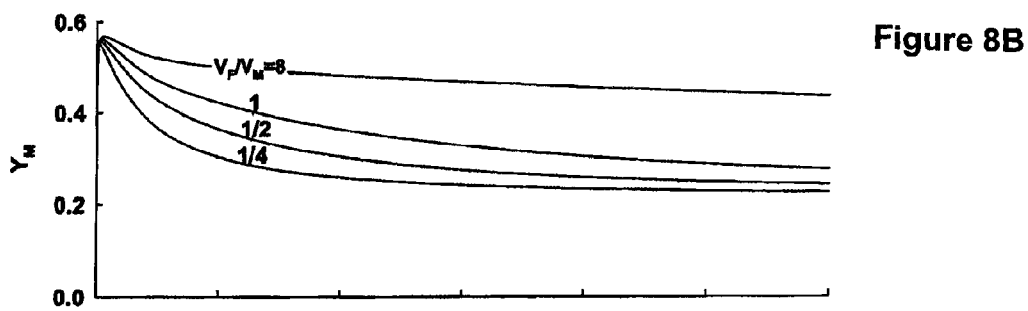
FIG. 8B is a graph illustrating permeate $O_2$ concentration at different ($V_F/V_M$) values as a function of time for Step 2 of the pressure-vacuum swing permeation process being practiced in the system of FIG. 4, for $P_1$=7 atm, $p_v$=10 mmHg, and (A/$V_M$)=10,000 $m^2/m^3$.
Figure 8A:
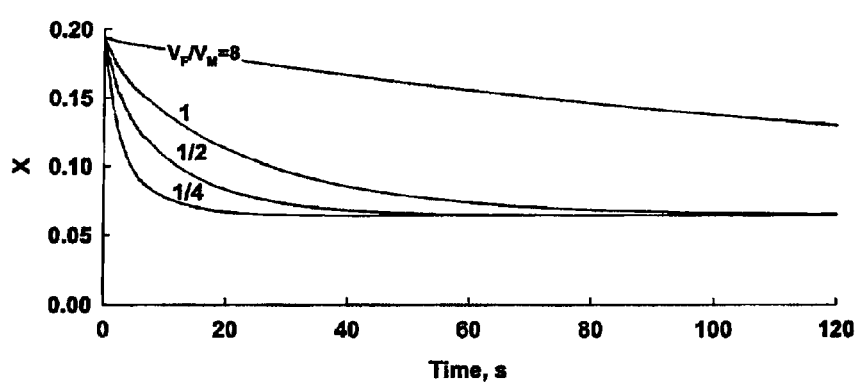
FIG. 8A is a graph illustrating residue $O_2$ concentration at different ($V_F/V_M$) values as a function of time for Step 2 of the pressure-vacuum swing permeation process being practiced in the system of FIG. 4, for $P_1$=7 atm, $p_v$=10 mmHg, and (A/$V_M$)=10,000 $m^2/m^3$.
Figure 9:
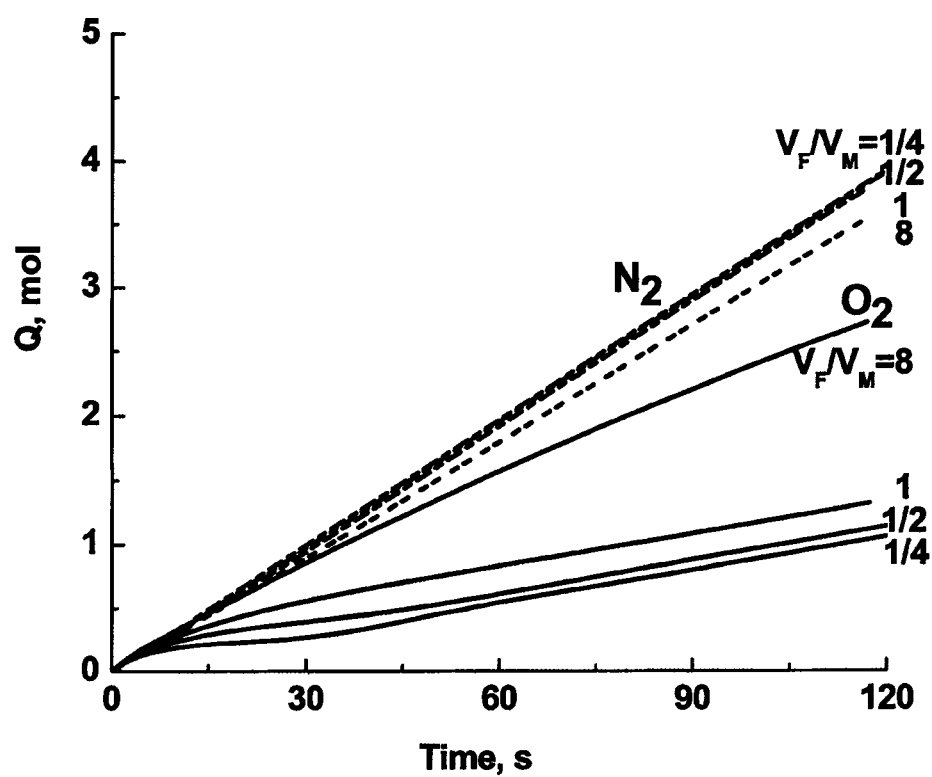
FIG. 9 is a graph illustrating quantities of oxygen and nitrogen in permeate vs time during Step 2 of the pressure-vacuum swing permeation process being practiced in the system of FIG. 4 for $P_1$=7 atm, $p_v$=10 mmHg, and (A/$V_M$)=10,000 $m^2/m^3$.

FIG. 8 shows the calculated results with different ($V_F/V_M$) values for permeation over a period of 120 s; the ratio ($V_F/V_M$) represents the relative volumes occupied by the feed and permeate. During this step, the permeate pressure is set to an upper limit of 1 atm, as a permeate at such a pressure can be released readily by venting via a check valve. This will maximize the transmembrane pressure difference. As expected, at a given time, an increase in ($V_F/V_M$) will increase the concentrations of oxygen in both the residue and permeate. A relatively large $V_F$ means a large reservoir for the storage of feed gas, and thus the gas composition on the feed side will change less significantly because of the large amount of feed gas relative to the amount of gas permeated through the membrane. Therefore, a relatively high driving force for permeation can be sustained for a longer period of time, which favors the oxygen concentration in the permeate. The permeate pressure, on the other hand, increases very marginally with an increase in ($V_F/V_M$), which is also favorable for oxygen enrichment. This can further be demonstrated by FIG. 9 which shows the quantities of oxygen and nitrogen in the permeate as a function of time. With an increase in ($V_F/V_M$), the quantity of oxygen increases, whereas the quantity of nitrogen decreases. These results also show that a high value of ($V_F/V_M$) is disadvantageous for nitrogen concentration in the residue (see FIG. 8). By the same token, the use of a large volume for the permeate relative to the feed gas volume is expected to benefit nitrogen production.

It may be mentioned that in the calculation the initial values of X1 and YM1 are supposed to be calculated based on materials balance taking into account of the gases remaining in the permeator from the previous step; the calculation will involve iterations over all the process steps. It was found, however, that the calculated gas compositions on both the residue and permeate sides at the completion of this step (i.e., $X_2$ and $Y_{M2}$) varied very little (<3-4%) for a wide range of final product concentrations (i.e., permeate 35-45 mol % oxygen and residue 90-99 mol % nitrogen) under the operating conditions investigated. This is mainly because the amount of gas left from the previous step is insignificant. Thus, the initial values could be estimated based on the product concentrations without performing the cumbersome iterative calculations.

Step 3: Pump Function Switch from Compression to Evacuation

The pump mode is switched from feed compression to permeate evacuation so that the pressure on the permeate side drops to $p_v$ rapidly. The time for this step is very short and the permeation is neglected during this period.

Step 4: Permeation and Permeate Evacuation

Figure 10:
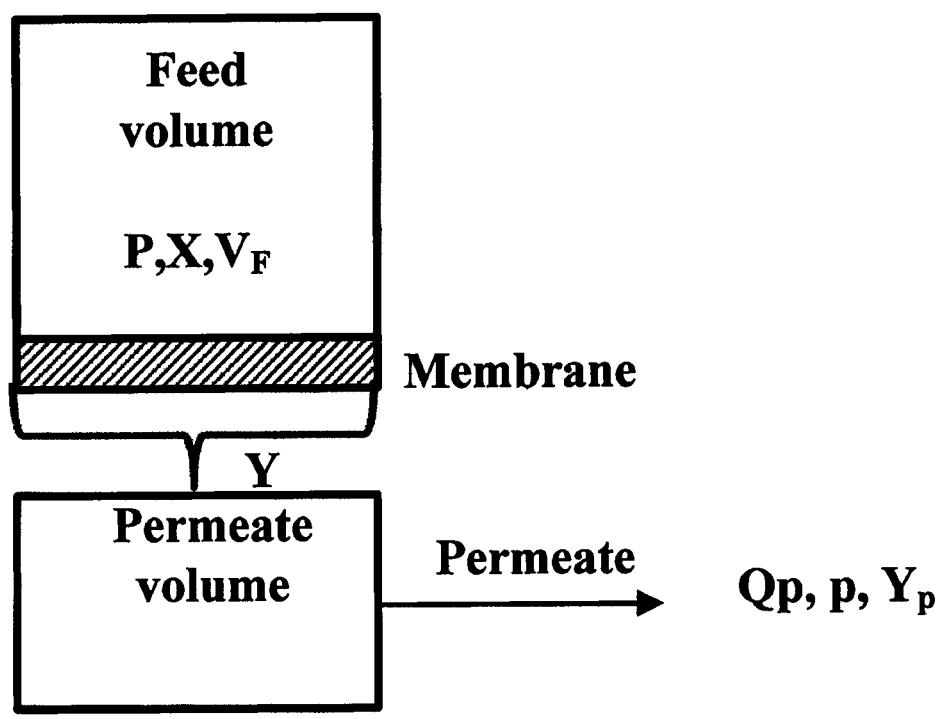
FIG. 10 is a schematic illustration of the permeation system illustrated in FIG. 4 in operation during the permeate evacuation step.
Figure 11C:
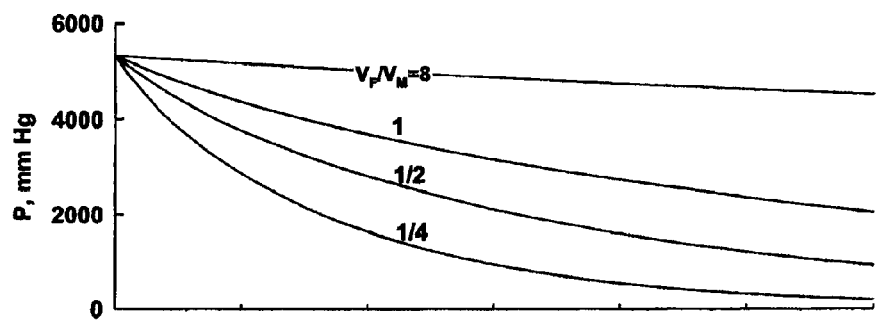
FIG. 11C is a graph illustrating effects of $(V_F/V_M)$ on permeate pressure during Step 4 of the process practiced in the system of FIG. 4 (or FIG. 10), for $P_1=7$ atm, $p_v=10$ mmHg, and $(A/V_M)=10,000$ m$^2$/m$^3$.
Figure 11B:
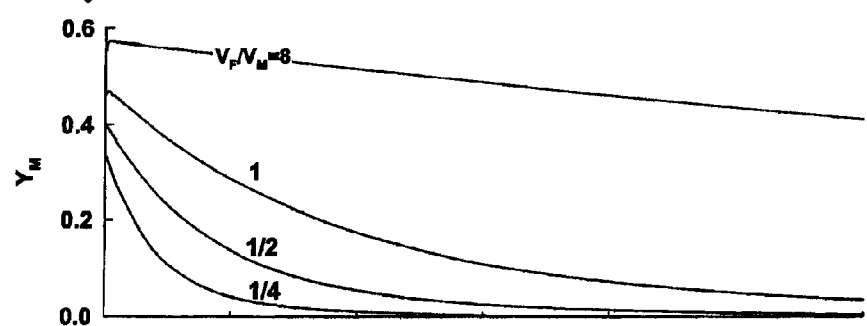
FIG. 11B is a graph illustrating effects of $(V_F/V_M)$ on permeate $O_2$ concentration during Step 4 of the process practiced in the system of FIG. 4 (or FIG. 10), for $P_1=7$ atm, $p_v=10$ mmHg, and $(A/V_M)=10,000$ m$^2$/m$^3$.
Figure 11A:
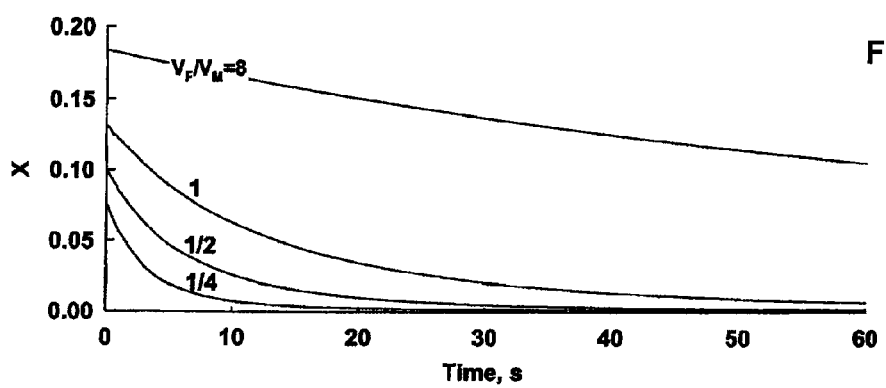
FIG. 11A is a graphs illustrating effects of $(V_F/V_M)$ on residue $O_2$ concentration during Step 4 of the process practiced in the system of FIG. 4 (or FIG. 10), for $P_1=7$ atm, $p_v=10$ mmHg, and $(A/V_M)=10,000$ m$^2$/m$^3$.
Figure 12:
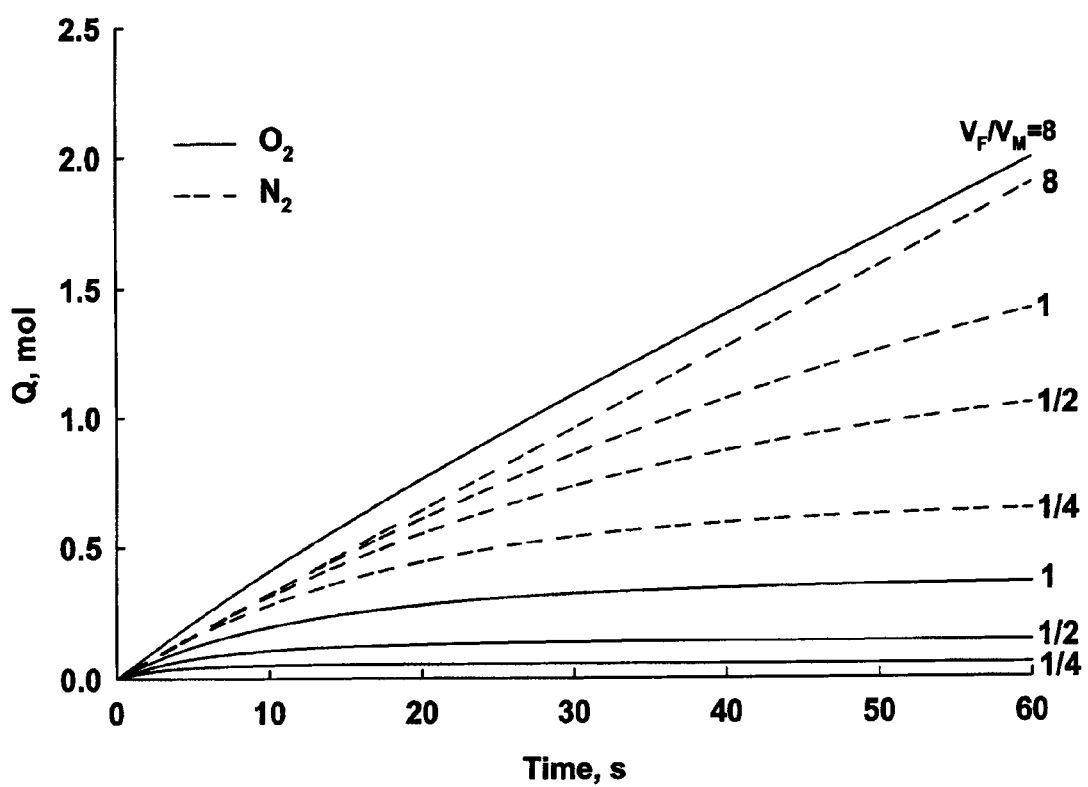
FIG. 12 is a graph illustrating quantities of oxygen and nitrogen in permeate vs time during Step 4 of the process practiced in the system of FIG. 4 (or FIG. 10), for $P_1=7$ atm, $p_v=10$ mmHg, and $(A/V_M)=10,000$ m$^2$/m$^3$.

During this step (from time $t_3$ to $t_4$) the feed admission is stopped, and the permeate is continuously evacuated. As a result, the pressure on the residue side gradually decreases due to gas permeation through the membrane, while the permeate side retains a constant pressure of $p_v$. Considering a permeation system in shown in FIG. 10, the pressure change on the feed side is related to the permeation rate by $$\frac{dp}{dt} = -\left(\frac{dQ_A}{dt} + \frac{dQ_B}{dt}\right)\frac{RT}{V_F} \quad (8)$$

where the permeation rates $dQ_A/dt$ and $dQ_B/dt$ can be described by Eqns (2) and (3), respectively. Since no residue is withdrawn and no fresh feed is supplied during permeation, the quantity of an individual gas component on the feed side decreases at the same rate at which it permeates through the membrane. In addition, the removal rate of the permeate from the permeator is the same as the overall permeation rate. Based on materials balance, the following equations can be obtained $$X = \frac{\left(\frac{P_3 V_F}{RT}\right)X_3 - Q_A}{\left(\frac{P_3 V_F}{RT}\right)} \quad (9)$$

$$\frac{dQ_P}{dt} = \frac{dQ_A}{dt} + \frac{dQ_B}{dt} \quad (10)$$

$$Y_P = \frac{Q_{PA}}{Q_P} = \frac{Q_{PA}}{Q_A + Q_B} \quad (11)$$

$$\frac{dQ_{PA}}{dt} = \frac{dQ_P}{dt} Y_M \quad (12)$$

$$Y_M = \frac{Q_A + \left(\frac{p_v V_M Y_{M3}}{RT}\right)X_3 - Q_{PA}}{\left(\frac{p_v V_M}{RT}\right)} \quad (13)$$

where $Q_P$ represents the quantity of permeate withdrawn and collected during this step, and $Y_p$ is the instantaneous concentration of the permeate leaving from the permeate side of the membrane. The values of $X_3$ and $Y_{M3}$ are assumed to be equal to $X_2$ and $Y_{M2}$, respectively, which have been calculated in Step 2. For the sake of calculation, a time interval of 15 s was chosen for Step 2. The calculated results showed that the general trends for the effects of parameters $P_1$, (A/V) and $p_v$ on the separation performance were very similar to those shown for Step 2 since these two steps are fundamentally same. It should, however, be emphasized that because a higher pressure differential across the membrane may be achieved in Step 4, the relative volume ($V_F/V_M$) affects separation performance more significantly. As shown in FIG. 11, a high concentration of $O_2$ can be obtained at $p_v$ for a long time when a large $V_F$ is used, but this is at the expense of a low recovery since the concentration of $O_2$ on the feed remains high. Fortunately, for air separation the feed air is free and the recovery rate is often not a critical factor. Furthermore, the slow decline in the pressure on the feed side also helps maintain a high driving force for a relatively long period of time. An increase in the step time will reduce the pump switching frequencies for alternate compression and evacuation, which are desirable from an application perspective in terms of process control and operation. However, one should also keep in mind that as time proceeds, there is a reduction in the oxygen permeation rate. That is, the oxygen productivity will gradually slow down, as illustrated in FIG. 12. The rate of reduction in the oxygen productivity becomes more pronounced at lower ($V_F/V_M$) values. Clearly, the step time should be selected properly considering both the rate of productivity and the purity of the product. While a high ($V_F/V_M$) ratio (>1) favors oxygen enrichment of the permeate, the opposite is more suitable for nitrogen production where the residue is the target product.

Step 5: Residue Venting

In this step, the gas on the residue side, which is enriched with nitrogen, is vented for release, and its pressure quickly decreases. For oxygen enrichment, the venting pressure is preferably atmospheric pressure; a higher pressure may be used for nitrogen production when the residue stream is the primary product.

The above parametric analyses indicate that the pressure-vacuum swing permeation is feasible where the membrane permselectivity is generally low and that an increase in the transmembrane pressure will have a significant impact on the separation performance.

Prophetic Example

The overall separation performance of a pressure-vacuum swing permeation being practiced in the system 100 was evaluated for producing oxygen-enriched air at 40 and 45 mol % oxygen using the following quantities: membrane area A=100 $m^2$, feed pressure from compression $P_1$=7 atm (or 709 kPa), permeate pressure under evacuation $p_v$=10 mmHg (or 1.33 kPa). Other membrane and operating parameters were selected based on the above calculations for Steps 2 and 4. The results are summarized in Table 1, below. In the calculation, the time for Step 2 was determined so that at the end of this step the permeate pressure would reach atmospheric pressure, and the time for Step 4 was determined such that the overall concentration of oxygen in the accumulated permeate product would reach the desired target purity. Compared to the transient permeation processes which are based on differences in sorption uptake rates or desorption falloff rates, the present process is based on permselectivity of the membrane and a much longer cycle time can be used. It is obvious that the cycle time can be increased further by prolonging the time of Step 2. However, a substantially extended period will render the permeation similar to the conventional steady state permeation where the feed and permeate pressures are $P_h$ and $P_0$, respectively, thereby losing the advantage of using the swing process to enhance the driving force for permeation.

The data in Table 1 show that to attain a given oxygen concentration in the permeate product, an increase in $(V_F/V_M)$ will increase the oxygen recovery, while the productivity (that is, the mean flow rate of the oxygen enriched product per membrane area) decreases. This is consistent with the common observation in conventional membrane gas separation that a high recovery is often accompanied with a lower productivity for a given product purity [Liu L, Chakma A and Feng X. $CO_2/N_2$ Separation by Poly(Ether Block Amide) Thin Film Hollow Fiber Composite Membranes. *Ind. Eng. Chem. Res.* 44, 6874-6882 (2005)]. Similar tends apply in the pressure-vacuum swing mode of permeation. It is interesting to note that using a larger value of $(V_F/V_M)$ allows a longer cycle time to be used for the pressure-vacuum swing permeation, which is desired from an operating standpoint as less frequent valve switching will be favorable for process control and operation. On the other hand, for a given $(V_F/V_M)$ value, the pressure-vacuum swing process will have a higher productivity for a higher product concentration, but the recovery will be lowered. It should be pointed out that because $(V_F/V_M)$ determines the instantaneous oxygen concentration on the feed side, there exists a lower limit in $(V_F/V_M)$ below which a target oxygen concentration in the oxygen enriched air cannot be achieved. By the same token, for the enrichment of nitrogen (which is the slow gas) from air, there is an upper limit in $(V_F/V_M)$ above which a target nitrogen concentration in the nitrogen enriched air will be impossible to achieve.

The advantages of using pressure-vacuum swing permeation can be illustrated by comparing with the separation performance that would be obtained with conventional steady state operations. Table 2, below, shows the productivity and recovery for the same oxygen concentration (i.e., 40 and 45% oxygen) at steady state permeation with a counter-current feed/permeate flow configuration using (1) a single compressor to deliver a constant feed pressure of 709 kPa while the permeate is withdrawn at atmospheric pressure, or (2) a single vacuum pump to maintain a constant permeate pressure of 1.33 kPa while the feed air is at atmospheric pressure. The calculation was performed using the same permeability and selectivity while neglecting the permeate pressure buildup on the permeate side. It is shown that for a given product oxygen concentration, the productivity in case (2) is much lower than that in case (1), whereas case (2) tends to have a higher recovery. The separation performance in both cases (1) and (2) are inferior to the separation achieved using the pressure-vacuum swing permeation process. To produce 40% oxygen enriched air using the pressure-vacuum swing permeation, when $(V_F/V_M)$ varies over a wide range from 0.5 to 8, the productivity and recovery did not change substantially; they are in the range of 1.61-1.88 mol/($m^2$·h) and 93.1-97.1%, respectively. The steady state process in case (1) will yield a comparable productivity (i.e., 1.84 mol/$m^2$·h), but the oxygen recovery will be considerably lower (i.e., 75.6%). Clearly, the pressure-vacuum swing process using a single pump to alternatively compress the feed and evaluate the permeate in a cyclic fashion improves the separation efficiency. The improvement in separation is expected to be more significant when more permselective membranes are available with the advancement of membrane materials science and fabrication technique [Li Y, Chung T-S and Xiao Y. Superior gas separation performance of dual-layer hollow fiber membranes with an ultrathin dense-selective layer. *J. Membrane Sci.* 325, 23-27 (2008); Hosseini S S, Li Y, Chung T-S and Liu Y. Enhanced gas separation performance of nanocomposite membranes using MgO nanoparticles, *J. Membrane Sci.* 302, 207-217 (2007)].

TABLE 1

Performance of press-vacuum swing permeation for oxygen enrichment from air.

| Purpose of separation | $O_2$ enrichment | | | | | |
|---|---|---|---|---|---|---|
| Volume ratio ($V_F/V_M$) | 8/1 | | 1/1 | | 1/2 | |
| Desired oxygen concentration (mol %) | 40 | 45 | 40 | 45 | 40 | 45 |
| Cycle time (s) | 226.1 | 154.1 | 29.4 | 19.8 | 15.2 | 9.4 |
| Mean flow rate of product (mol/$m^2$·h) | 1.61 | 1.86 | 1.75 | 2.01 | 1.88 | 2.11 |
| Recovery of the target component (%) | 97.1 | 85.4 | 96.1 | 82.8 | 93.1 | 72.3 |

A = 100 $m^2$,
$V_M$ = 0.01 $m^3$,
$P_h$ = 709 kPa,
$p_V$ = 1.33 kPa

TABLE 2

Performance of steady-state permeation for oxygen enrichment from air.

| | Case 1 | | Case 2 | |
|---|---|---|---|---|
| Feed and permeate pressures | Feed 709 kPa, permeate 101.3 kPa | | Feed 101.3 kPa, permeate 1.33 kPa | |
| Desired oxygen concentration (mol %) | 40 | 45 | 40 | 45 |
| Flow rate of product (mol/$m^2$·h) | 1.84 | 1.95 | 0.288 | 0.306 |
| Recovery of the target component (%) | 75.6 | 54.8 | 89.1 | 76.5 |

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A process for effecting permeation of at least an operative material component of an operative gaseous mixture from a higher pressure space, through a membrane, and into a lower pressure space, wherein the higher pressure space is disposed in mass transfer communication with the lower pressure space through the membrane, comprising:

after a decrease in a partial pressure differential, between the partial pressure of an operative material component within the higher pressure space and the partial pressure of the operative material component within the lower pressure space, from a higher partial pressure differential, has been effected, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, and while a permeating fraction of the higher pressure space-disposed operative material component is permeating through the membrane, in response to, at least, a reduced partial pressure differential that is below that of the higher partial pressure differential, and being collected within the lower pressure space: effecting a decrease in the partial pressure of the operative material component within the lower pressure space, by effecting discharge of an operative material component discharge fraction of the operative material component, disposed within the lower pressure space, from the lower pressure space, wherein the decrease in the partial pressure of the operative material component within the lower pressure space is a decrease from a pre-discharge pressure;

wherein the ratio of the volume of the higher pressure space to the volume of the lower pressure space is greater than 1.

2. The process as claimed in claim 1;
wherein, prior to the effecting of a decrease in the partial pressure of the operative material component within the lower pressure space by effecting discharge of the operative material component discharge fraction from the lower pressure space, a decrease in the partial pressure of the operative material component within the higher pressure space is effected by the permeation of the permeated fraction of the operative material component disposed within the higher pressure space.

3. The process as claimed in claim 1;
wherein, prior to the effecting of a decrease in the partial pressure of the operative material component within the lower pressure space by effecting discharge of the operative material component discharge fraction from the lower pressure space, a decrease in the pressure within the higher pressure space is effected by the permeation of the permeated fraction of the operative material component disposed within the higher pressure space.

4. The process as claimed in claim 1;
wherein, prior to the effecting of a decrease in the partial pressure of the operative material component within the lower pressure space by effecting discharge of the operative material component discharge fraction from the lower pressure space, an increase in the partial pressure of the operative material component within the lower pressure space is effected by the permeation of the permeated fraction of the operative material component disposed within the higher pressure space.

5. The process as claimed in claim 1;
wherein, prior to the effecting of a decrease in the partial pressure of the operative material component within the lower pressure space by effecting discharge of the operative material component discharge fraction from the lower pressure space, an increase in the pressure within the lower pressure space is effected by the permeation of the permeated fraction of the operative material component disposed within the higher pressure space.

6. The process as claimed in claim 1;
wherein the permeation of the permeating fraction of the operative material component disposed within the higher pressure space is being effected while at least one slower-permeating material component is permeating from the higher pressure space, through the membrane and into the lower pressure space, and wherein for each one of the slower permeating components, the ratio of the molar rate of permeation of the slower permeating component to the mole fraction of the slower permeating component within the higher pressure space is less than the ratio of the molar rate of permeation of the operative material component to the mole fraction of the operative material component within the higher pressure space.

7. The process as claimed in claim 6;
wherein the higher pressure space-disposed operative material component is included within an operative material mixture disposed in the high pressure space;
and wherein the permeation of the permeating fraction of the higher pressure space-disposed operative material component is being effected while at least one slower-permeating material component is permeating from the higher pressure space, through the membrane and into the lower pressure space, and wherein for each one of the slower permeating components, the ratio of the molar rate of permeation of the slower permeating component to the mole fraction of the slower permeating component within the higher pressure space is less than the ratio of the molar rate of permeation of the operative material component to the mole fraction of the operative material component within the higher pressure space, such that separation of an operative material-rich separation product, from the operative material mixture, is effected, wherein the operative material-rich separation product is disposed within the lower pressure space, and wherein the molar concentration of the operative material component is greater within the operative material-rich separation product than within the operative material mixture.

8. The process as claimed in claim 1;
wherein the effecting of a decrease in the partial pressure differential includes effecting an increase in the partial pressure of the operative material component within the lower pressure space.

9. The process as claimed in claim 1;
wherein the effecting of a decrease in the partial pressure differential includes effecting a decrease in the partial pressure of the operative material component within the higher pressure space.

10. The process as claimed in claim 1;
wherein the effecting of a decrease in the partial pressure of the operative material component within the lower pressure space is effected in response to the sensing of a first permeating operative material component low permeation rate indication.

11. The process as claimed in claim 1;
further comprising supplying a material mixture feed from a material mixture source to the higher pressure space while the permeation of the permeated fraction of the higher pressure space-disposed operative material component is being effected.

12. The process as claimed in claim 11;
wherein the supplying of the material mixture feed is effected by a prime mover.

13. The process as claimed in claim 11;
further comprising at least temporarily suspending the supplying of the material mixture feed prior to the effecting of a decrease in the partial pressure of the operative material component within the lower pressure space.

14. The process as claimed in claim 12;
wherein the effecting of a decrease in the partial pressure of the operative material component within the lower pressure space, by effecting discharge of an operative material component discharge fraction of the operative material component disposed within the lower pressure space, from the lower pressure space, includes effecting fluid communication with a downstream space, wherein the downstream space pressure within the downstream space is less than a lower pressure space pressure of the lower pressure space, and wherein the downstream space pressure is generated by the same prime mover that has been effecting the supplying of the material mixture feed to the higher pressure space prior to the suspension of the supplying of the material mixture feed.

15. The process as claimed in claim 1;
wherein the effecting of a decrease in the partial pressure of the operative material component within the lower pressure space, by effecting discharge of an operative material component discharge fraction of the operative material component, disposed within the lower pressure space, from the lower pressure space, includes effecting fluid communication with a downstream space, wherein the partial pressure of the operative material component within the downstream space is less than the partial pressure of the operative material component within the lower pressure space.

16. The process as claimed in claim 1;
wherein the effecting of a decrease in the partial pressure of the operative material component in the lower pressure space effects an increase in the partial pressure differential and thereby effects an increase in the molar rate at which permeation of a permeating fraction of the higher pressure space-disposed operative material component is being effected through the membrane and into the lower pressure space.

17. The process as claimed in claim 13;
wherein, after the supplying of the material mixture feed is at least temporarily suspended, and after the decrease in the partial pressure of the operative material component within the lower pressure space, from the pre-discharge pressure, has been effected, permeation of a permeating fraction of the higher pressure space-disposed operative material component is effected while the partial pressure of the operative material component within lower pressure space is disposed below the pre-discharge pressure.

18. A process for effecting permeation of at least an operative material component of an operative gaseous mixture from a higher pressure space, through a membrane, and into a lower pressure space, wherein the higher pressure space is disposed in mass transfer communication with the lower pressure space through the membrane, comprising:
after a decrease in a partial pressure differential, between the partial pressure of an operative material component within a higher pressure space and the partial pressure of the operative material component within a lower pressure space, from a higher partial pressure differential, has been effected, wherein the higher pressure space is disposed in mass transfer communication with the lower pressure space through a membrane, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, such that an increase in the pressure within the lower pressure space to above atmospheric pressure is effected by the permeation of the permeated fraction of the operative material component disposed within the higher pressure space, and while a permeating fraction of the higher pressure space-disposed operative material component is permeating through the membrane, in response to, at least, a reduced partial pressure differential that is below that of the higher partial pressure differential, and being collected within the lower pressure space: effecting a decrease in the partial pressure of the operative material component within the lower pressure space, by effecting discharge of an operative material component discharge fraction from the operative material component disposed within the lower pressure space.

19. The process as claimed in claim 18;
wherein the effecting of a decrease in the partial pressure of the operative material component within the lower pressure space is effected in response to the sensing of a pressure within the lower pressure space that exceeds atmospheric pressure.

20. A process for effecting permeation of at least an operative material component of an operative gaseous mixture from a higher pressure space, through a membrane, and into a lower pressure space, wherein the higher pressure space is disposed in mass transfer communication with the lower pressure space through the membrane, comprising:
after a decrease in a partial pressure differential, between the partial pressure of an operative material component within a higher pressure space and the partial pressure of the operative material component within a lower pressure space, from a higher partial pressure differential, has been effected, wherein the higher pressure space is disposed in mass transfer communication with the lower pressure space through a membrane, and wherein the decrease in the partial pressure differential includes that effected by permeation of a permeated fraction of an operative material component disposed within the higher pressure space, from the higher pressure space, through the membrane, and into the lower pressure space, in response to, at least, the partial pressure differential, and while a permeating fraction of the higher pressure space-disposed operative material component is permeating through the membrane, in response to, at least, a reduced partial pressure differential that is below that of the higher partial pressure differential, and being collected within the lower pressure space effecting a decrease in the partial pressure of the operative material component within the lower pressure space, by effecting discharge of an operative material component discharge fraction from the operative material component disposed within the lower pressure space, wherein the decrease in the partial pressure of the operative material component within the lower pressure space is a decrease from a pre-discharge pressure;
wherein a material mixture feed is supplied from a material mixture source to the higher pressure space while the permeation of the permeated fraction of the higher pressure space-disposed operative material component is being effected, and wherein the supplying of the material mixture feed is at least temporarily suspended prior to the effecting of a decrease in the partial pressure of the operative material component within the lower pressure space;

and wherein, after the supplying of the material mixture feed is at least temporarily suspended, and after the decrease in the partial pressure of the operative material component within the lower pressure space, from the pre-discharge pressure, has been effected, permeation of a permeating fraction of the higher pressure space-disposed operative material component is effected while the partial pressure of the operative material component within lower pressure space is disposed below the pre-discharge pressure and while the permeation of the permeating fraction of the higher pressure space-disposed operative material component is being effected while the partial pressure of the operative material component within the lower pressure space is disposed below the pre-discharge pressure, and a decrease in the partial pressure of the operative material component within the higher pressure space is effected in response to, at least, the permeation of the permeating fraction of the higher pressure space-disposed operative material component that is effected while the partial pressure of the operative material component within the lower pressure space is disposed below the pre-discharge pressure;

and wherein, after the discharging, and after the decrease in the partial pressure of the operative material component within the higher pressure space has been effected in response to the permeation of the permeating fraction of the higher pressure space-disposed operative material component that is effected while the partial pressure of the operative material component within the lower pressure space is disposed below the pre-discharge pressure, effecting an increase in the partial pressure of the operative material component within the higher pressure space from a pre-pressure increase pressure, which thereby effects an increase in the molar rate at which the permeation of the permeating fraction of the higher pressure space-disposed operative material component is being effected through the membrane and into the lower pressure space, wherein the increase in the partial pressure of the operative material component within the higher pressure space is effected by supplying of the material mixture feed;

wherein, prior to the supplying of the material mixture feed for effecting the increase in the partial pressure of the operative material component within the higher pressure space, and the increase in the molar rate at which the permeation of the permeating fraction of the higher pressure-disposed operative material component is being effected through the membrane and into the lower pressure space, discharging at least a fraction of material remaining within the higher pressure space.

21. The process as claimed in claim 20;

wherein the material mixture feed includes the operative material component, and the supply of the material mixture feed effects replenishment of the operative material component within the higher pressure space.

22. The process as claimed in claim 21;

wherein the supplying of the material mixture feed, for the effecting of the increase in the partial pressure of the operative material component within the higher pressure space, is effected in response to the sensing of an operative material component low permeation rate indicator.

23. The process as claimed in claim 20;

wherein the combination of the discharging of at least a fraction of material remaining within the higher pressure space, followed by the supplying of the material mixture feed for effecting an increase in the partial pressure of the operative material component within the higher pressure space, is effected in response to the sensing of a second operative material component low permeation rate indicator.

\* \* \* \* \*